United States Patent
Kaneko et al.

(10) Patent No.: US 10,480,492 B2
(45) Date of Patent: Nov. 19, 2019

(54) ACTUATOR DEVICE

(71) Applicant: Panasonic Intellectual Property Management Co., Ltd., Osaka (JP)

(72) Inventors: Yuriko Kaneko, Nara (JP); Maki Hiraoka, Nara (JP); Hidekazu Arase, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 69 days.

(21) Appl. No.: 15/696,239

(22) Filed: Sep. 6, 2017

(65) Prior Publication Data
US 2018/0163707 A1  Jun. 14, 2018

(30) Foreign Application Priority Data
Dec. 8, 2016  (JP) .................................. 2016-238591

(51) Int. Cl.
*F03G 7/06*  (2006.01)

(52) U.S. Cl.
CPC ............... *F03G 7/065* (2013.01); *F03G 7/06* (2013.01)

(58) Field of Classification Search
CPC ................................. F03G 7/06; F03G 7/065
USPC ............................ 60/527–529; 310/306, 307
See application file for complete search history.

(56) References Cited

U.S. PATENT DOCUMENTS

| 4,733,603 A | 3/1988 | Kukolj |
| 2009/0114303 A1* | 5/2009 | Kim ..................... F01N 13/1816 138/121 |
| 2015/0152852 A1* | 6/2015 | Li ......................... H02N 11/006 60/528 |

(Continued)

FOREIGN PATENT DOCUMENTS

| JP | 1998-275255 | * 4/1998 |
| JP | 2015-059276 | 3/2015 |

(Continued)

OTHER PUBLICATIONS

The Extended European Search Report dated Aug. 10, 2018 for the related European Patent Application No. 17189333.2.

(Continued)

*Primary Examiner* — Mark A Laurenzi
*Assistant Examiner* — Mickey H France
(74) *Attorney, Agent, or Firm* — McDermott Will & Emery LLP

(57) ABSTRACT

The present invention provides an actuator device comprising an actuator wire; a net-shaped electric heating element which covers a side surface of the actuator wire and comprises heating wires; and a controller for supplying electric power to the net-shaped electric heating element to heat the net-shaped electric heating element. The actuator wire is capable of being contracted by application of heat and restored by release of heat. The side surface of the actuator wire is formed of polymer. One end and the other end of the net-shaped electric heating element is connected to one end (Continued)

and the other end of the actuator wire, respectively. The net-shaped electric heating element is in contact with the side surface of the actuator wire, when the net-shaped electric heating element is not heated. The net-shaped electric heating element is moved outward from the side surface of the actuator wire due to contraction of the actuator wire, when the net-shaped electric heating element is heated.

16 Claims, 28 Drawing Sheets

(56) References Cited

U.S. PATENT DOCUMENTS

| | | | |
|---|---|---|---|
| 2016/0177929 A1 | 6/2016 | Marion et al. | |
| 2016/0326675 A1 | 11/2016 | Kinugasa | |
| 2017/0035550 A1 | 2/2017 | Hiraoka et al. | |
| 2017/0292502 A1* | 10/2017 | Tonazzini | B22D 19/00 |

FOREIGN PATENT DOCUMENTS

| | | |
|---|---|---|
| JP | 2016-042783 | 3/2016 |
| WO | 2005/027333 A1 | 3/2005 |
| WO | 2014/022667 | 2/2014 |
| WO | 2017/022146 | 2/2017 |

OTHER PUBLICATIONS

Maki Hiraoka et al., "Large strains and their polymer chain morphologies on coiled polymer fiber actuators", Symposium of the 24th Polymer material forum, Nov. 15, 2015.

* cited by examiner

--- PRIOR ART ---

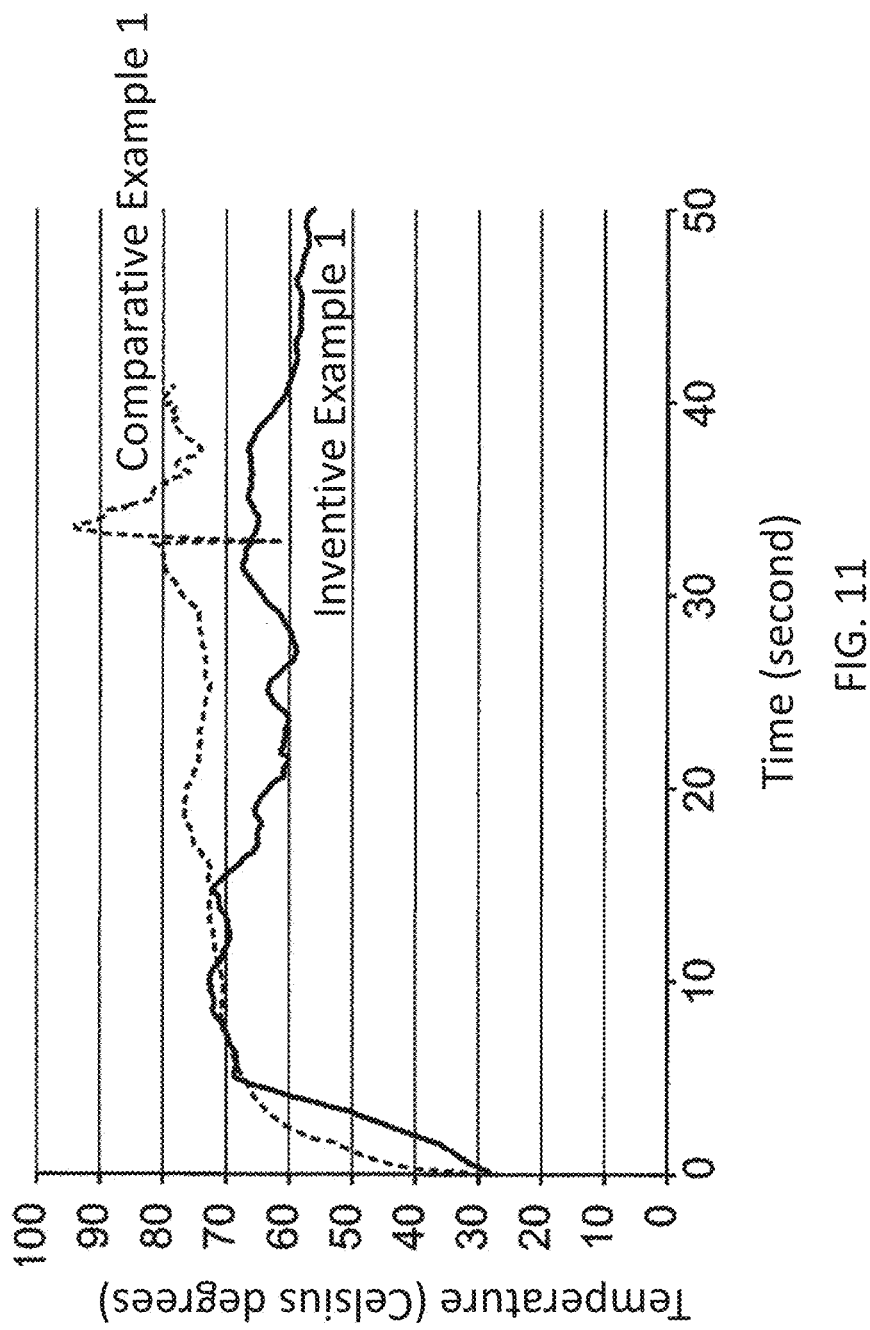

ACTUATOR DEVICE

BACKGROUND

1. Technical Field

The present invention relates to an actuator device.

2. Description of the Related Art

LI Na et. al. disclose coiled and non-coiled twisted nanofiber yarn and polymer fiber torsional and tensile actuators in WO2014/022667. Maki Hiraoka et. al. disclose a colied polymer fiber formed of linear low-density polyethylene in the poster having a title of "Large strains and their polymer chain morphologies on coiled polymer fiber actuators", which was released at the symposium of the 24th Polymer Material Forum, which was held on Nov. 26, 2015, in Tokyo, JAPAN. According to Maki Hiraoka et. al., the colied polymer fiber is capable of being contracted by application of heat and being restored by release of heat. Kukolj discloses an axially contractable actuator in U.S. Pat. No. 4,733,603.

SUMMARY

The present invention provides an actuator device, comprising:

an actuator wire;

a net-shaped electric heating element which covers a side surface of the actuator wire and comprises heating wires; and a controller for supplying electric power to the net-shaped electric heating element to heat the net-shaped electric heating element;

wherein the actuator wire is capable of being contracted by application of heat and restored by release of heat;

the side surface of the actuator wire is formed of polymer;

one end of the net-shaped electric heating element is connected to one end of the actuator wire;

another end of the net-shaped electric heating element is connected to another end of the actuator wire;

the net-shaped electric heating element is in contact with the side surface of the actuator wire, when the net-shaped electric heating element is not heated; and the net-shaped electric heating element is moved outward from the side surface of the actuator wire due to contraction of the actuator wire, when the net-shaped electric heating element is heated.

The present invention provides an actuator device in which the surface thereof is protected from the burnout.

BRIEF DESCRIPTION OF THE DRAWINGS

FIG. 11 is a graph showing the temperature of the side surfaces of the actuator wires according to the inventive example 1 and the comparative example 1.

DETAILED DESCRIPTION OF THE EMBODIMENT

Hereinafter, an embodiment of the present invention will be described with reference to the drawings.

Figure 1:
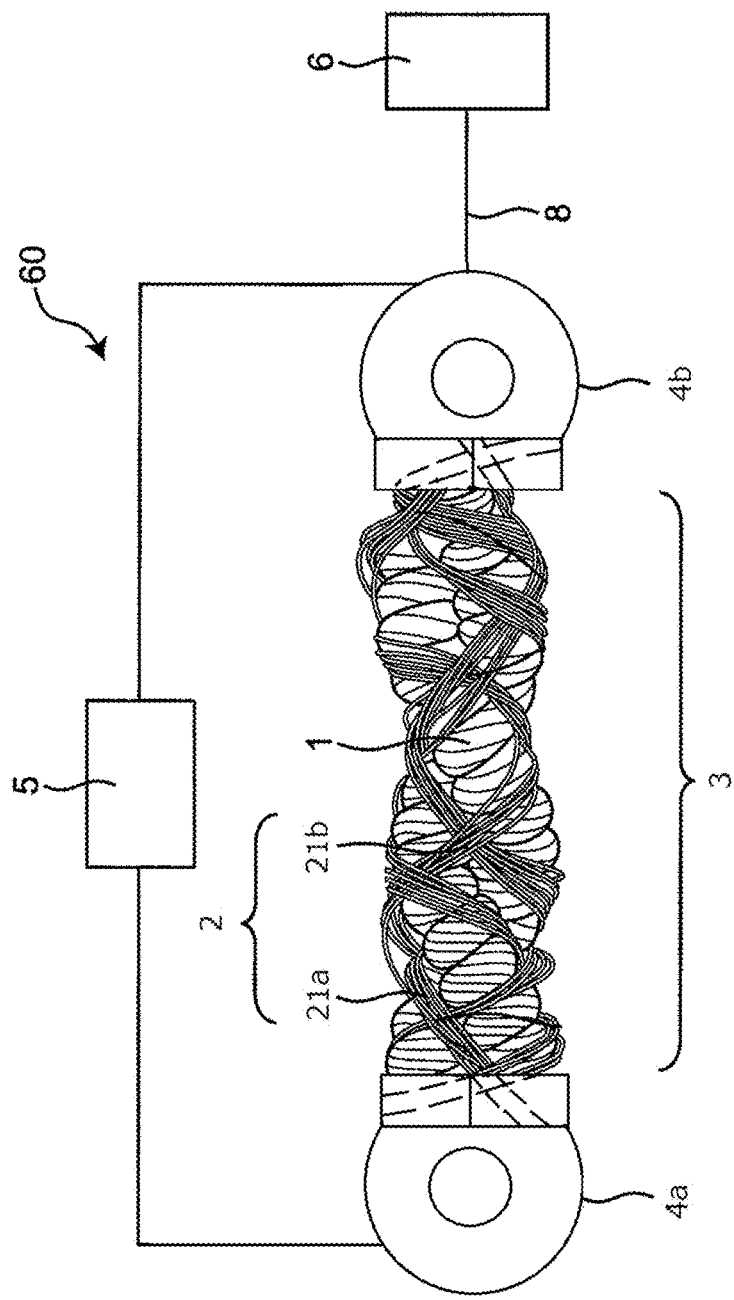
FIG. 1 shows a schematic view of an actuator device according to an embodiment.

FIG. 1 shows a schematic view of an actuator device 60 according to the embodiment. The actuator device 60 according to the embodiment comprises an actuator wire 1, a net-shaped electric heating element 2, and a controller 5.

(Actuator Wire 1)

For the detail of the actuator wire 1, see the preceding U.S. patent application Ser. No. 15/245,145, the whole of which is incorporated by reference. As described in the background, Maki Hiraoka et, al, disclose the actuator wire 1. The present invention can be directed to improvement of the actuator wire 1 disclosed in the preceding U.S. patent application Ser. No. 15/245,145. The terms "actuator wire 1" and "net-shaped electric heating element 2" used in the present specification correspond respectively to the terms "fiber" and "heat regulator" used in the preceding U.S. patent application Ser. No. 15/245,145.

As disclosed in the preceding U.S. patent application Ser. No. 15/245,145, the actuator wire 1 may be composed of coiled polymer fibers formed of linear low-density polyethylene. The actuator wire 1 is capable of being contacted by application of heat and being restored by release of the heat. As one example, the actuator wire 1 is contracted by approximately 23%, when the actuator wire 1 having one end to which a load of 10 MPa has been applied is heated to 90 degrees Celsius. When the actuator wire 1 is cooled to room temperature, the actuator wire 1 is restored so as to have its original length. As disclosed in the preceding U.S. patent application Ser. No. 15/245,145, the actuator wire 1 can be heated, for example, to not less than 30 degrees Celsius and not more than 100 degrees Celsius. Note that the material of the coiled polymer fiber is not limited to linear low-density polyethylene. An example of the material of the coiled polymer fiber is polyethylene (e.g., low-density polyethylene or high-density polyethylene), nylon (e.g., nylon 6, nylon 6,6 or nylon 12), polyester, or an elastomer (e.g., silicone rubber).

Figure 2:
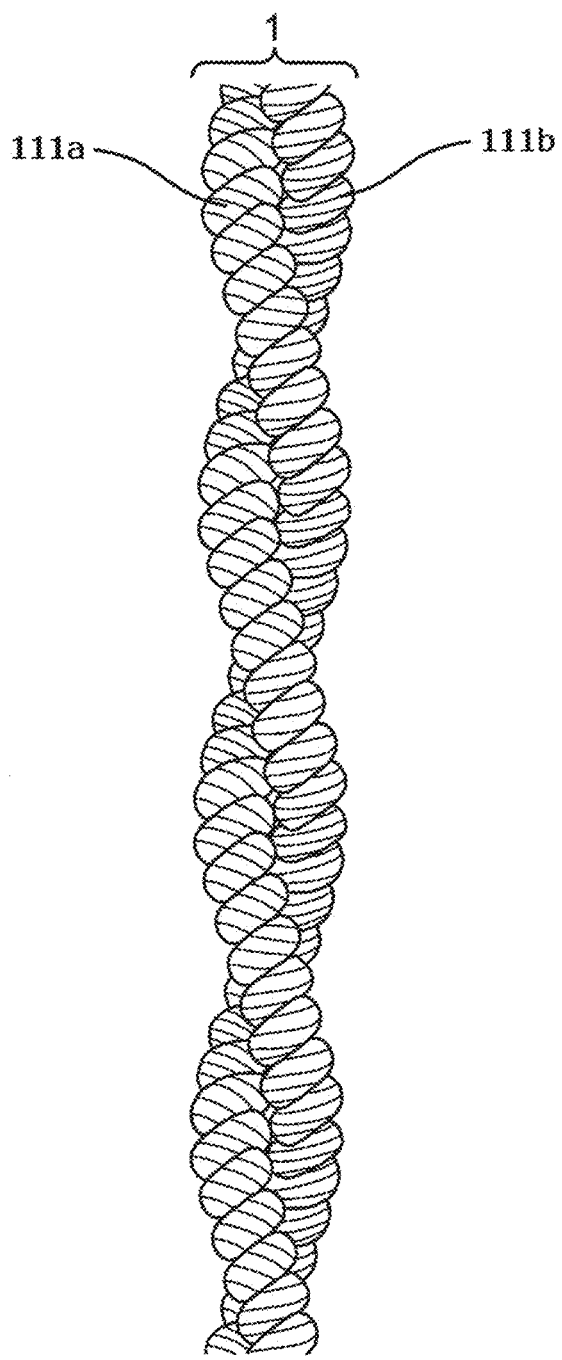
FIG. 2 shows a schematic view of an actuator wire composed of two colied polymer fibers twisted together.

The actuator wire 1 may be composed of one coiled polymer fiber. As shown in FIG. 2, the actuator wire 1 may be composed of two or more coiled polymer fibers 111 which have been twisted together. In other words, the actuator wire 1 can be formed by twisting two or more coiled polymer fibers 111 in such a manner that the side surface of one twisted coiled polymer fiber 111a is brought into contact with the side surface of other twisted coiled polymer fiber 111b. In FIG. 2, the actuator wire 1 is composed of two coiled polymer fibers 111 which have been integrated so as to be twisted together.

(Net-shaped Electric Heating Element 2)

The net-shaped electric heating element 2 covers the side surface of the actuator wire 1. It is desirable that the net-shaped electric heating element 2 is tubular so as to contain the actuator wire 1. The net-shaped electric heating element 2 is composed of plural electric heating wires 21. As will be described later, the net-shaped electric heating element 2 is formed by braiding, knitting, or weaving the electric heating wires 21.

An example of the electric heating wire 21 is a metal wire, a wire formed of electric conductive polymer, or a sheathed heater. An example of the shape of the wire is yarn or a thin plate. To improve the strength of the electric heating wire 21, the side surface of the electric heating wire 21 may be coated with a film formed of stretchable resin.

The net-shaped electric heating element 2 may be formed of the electric heating wires 21. As shown in FIG. 1 and FIG. 3B, it is desirable that the electric heating wires 21 intersect each other in such a manner that the net-shaped electric heating element 2 has a shape of a net as a whole.

The net-shaped electric heating element 2 is formed of any one of braided electric heating wires 21, knitted electric heating wires 21, or weaved electric heating wires 21.

The net-shaped electric heating element 2 shown in FIG. 1 is formed of the braided electric heating wires 21. FIG. 3B shows a simple schematic view of the actuator device comprising the net-shaped electric heating element 2 formed of the braided electric heating wires 21. The electric heating wires 21a and 21b are braided so as to wind helically on the side surface of the actuator wire 1 to constitute the net-shaped electric heating element 2 which covers the side surface of the actuator wire 1. It is desirable that three or more electric heating wires 21 are braided to constitute the net-shaped electric heating element 2. Each of the electric heating wires 21 may have a shape of a coil (namely, a helix). Each of the electric heating wires 21 may have a shape of yarn. Each of the electric heating wires 21 is braided in a left-hand lay (i.e., S-twist) or a right-hand lay (i.e., Z-twist).

Figure 3A:
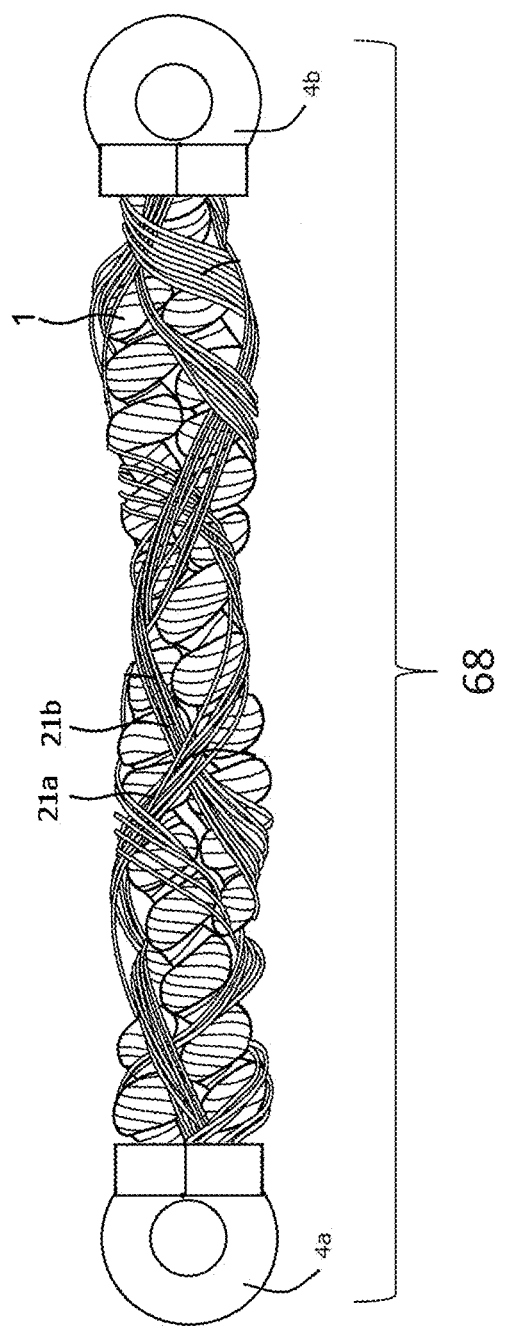
FIG. 3A is a schematic view of an actuator member when a net-shaped electric heating element is not heated.
Figure 3B:
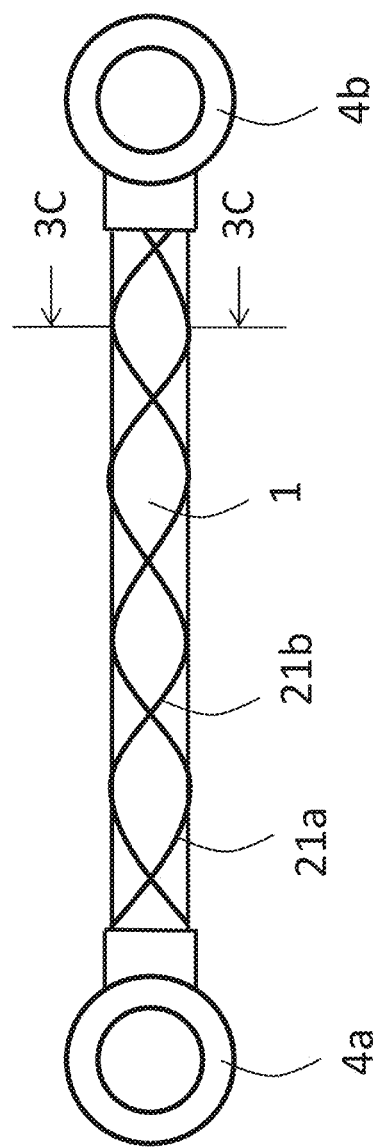
FIG. 3B shows a simple drawing of FIG. 3A.
Figure 3C:
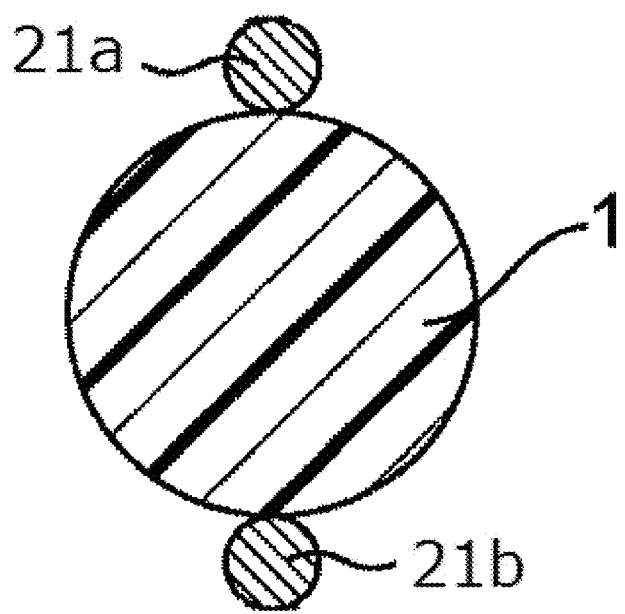
FIG. 3C shows a cross-sectional view taken along the line 3C-3C included in FIG. 3B.
Figure 3D:
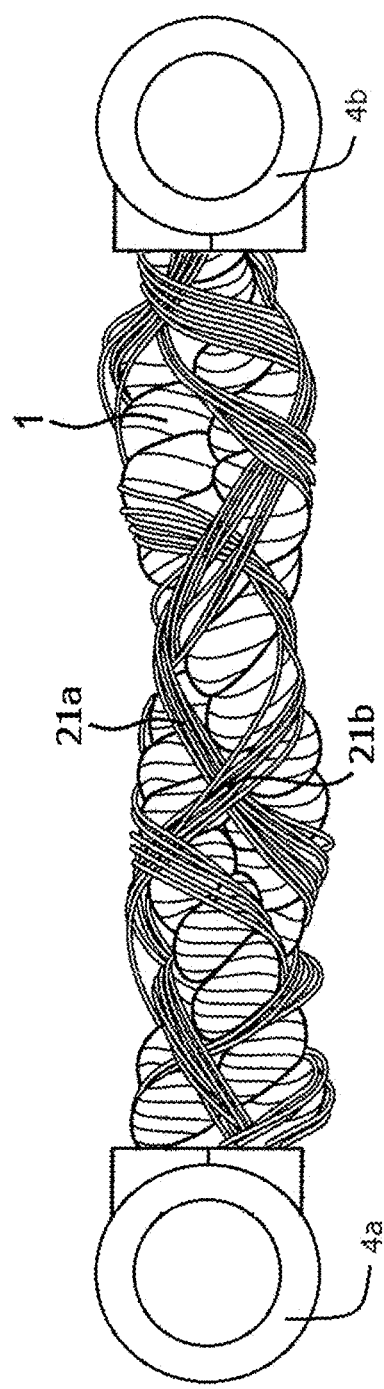
FIG. 3D is a schematic view of the actuator member after the net-shaped electric heating element is heated to some extent.
Figure 3E:
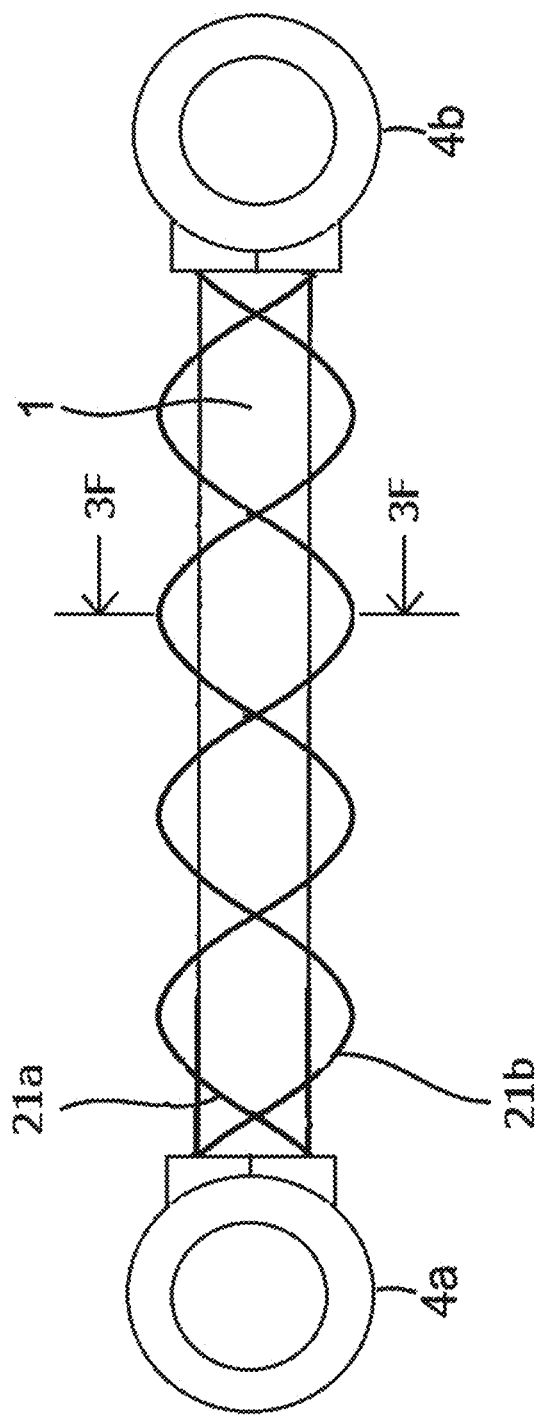
FIG. 3E shows a simple drawing of FIG. 3D.
Figure 3F:
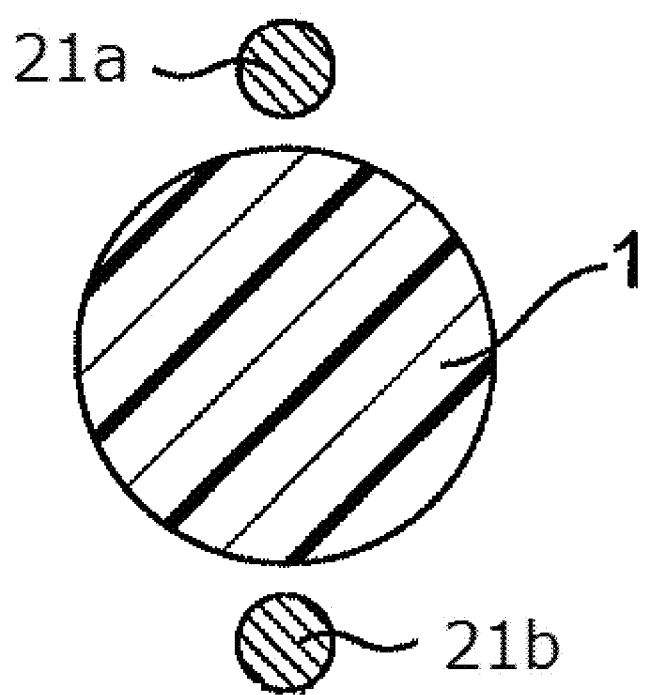
FIG. 3F shows a cross-sectional view taken along the line 3E-3E included in FIG. 3D.
Figure 3G:
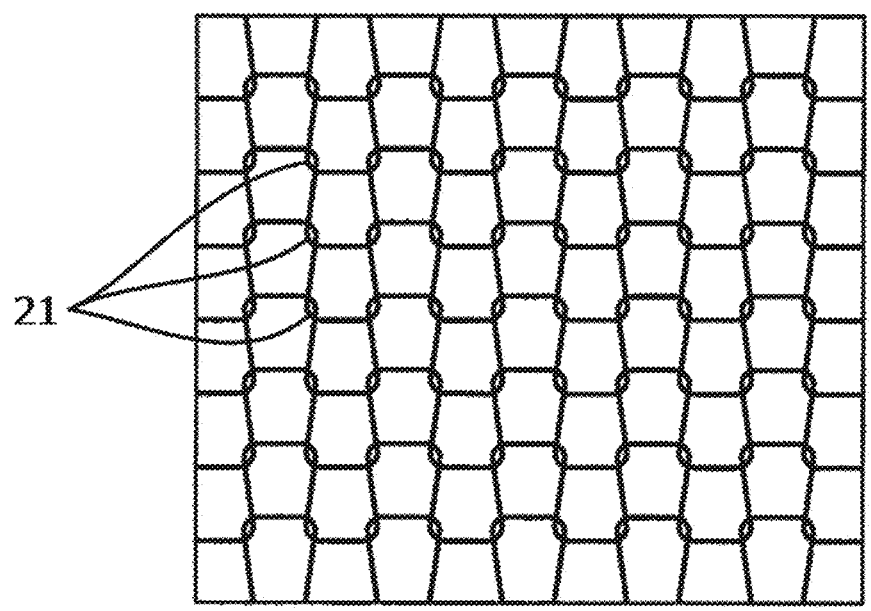
FIG. 3G shows a schematic view of knitted heating wires.

FIG. 3G shows a schematic view of the knitted electric heating wires 21. Each of the electric heating wires 21 may have a shape of a square wave. Two adjacent electric heating wires 21 included in the knitted electric heating wires 21 are engaged with each other. The net-shaped electric heating element 2 composed of the knitted electric heating wires 21 is wound on the side surface of actuator wire 1.

Figure 3H:
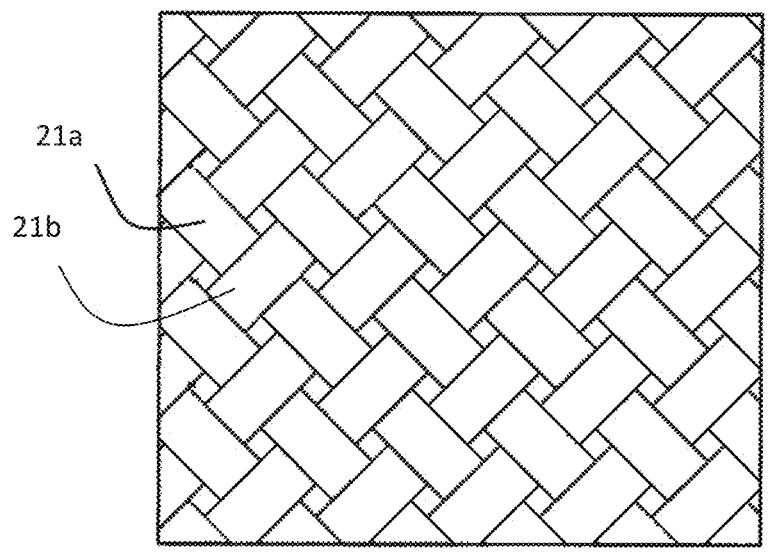
FIG. 3H shows a schematic view of woven heating wires.
Figure 3I:
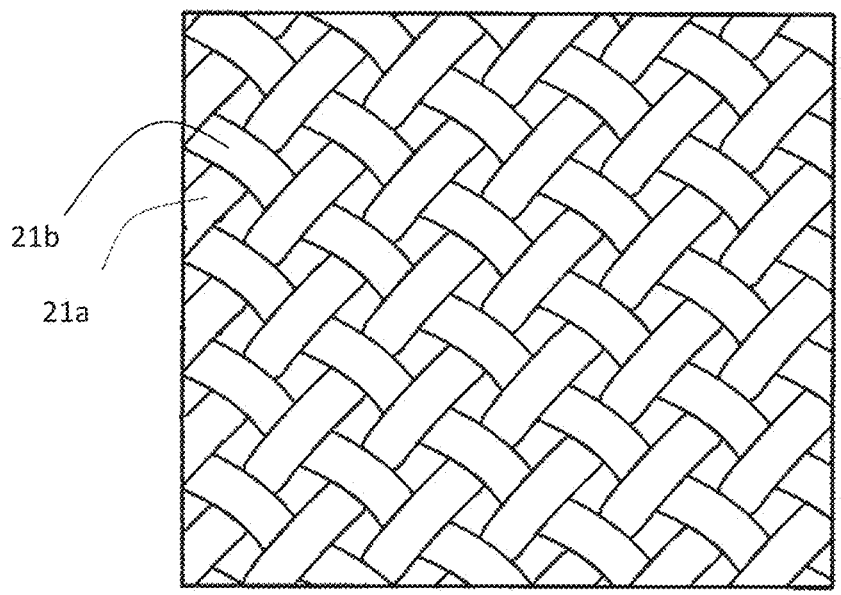
FIG. 3I shows another schematic view of woven heating wires.

FIG. 3H and FIG. 3I show schematic views of the woven electric heating wires 21. Each of the electric heating wires 21 may have a shape of a slim plate. The electric heating wires 21a and 21b are woven so as to wind helically on the side surface of the actuator wire 1 to constitute the net-shaped electric heating element 2 which covers the side surface of the actuator wire 1. The woven electric heating wires 21 are divided into first electric heating wires 21a and second electric heating wires 21b. The first electric heating wires 21a are parallel to one another. The second electric heating wires 21b are also parallel to one another. Each of the first electric heating wires 21a is in contact with a front surface of one second electric heating wire 21b of two adjacent second electric heating wires 21b and a back surface of the other second electric heating wire 21b of the two adjacent second electric heating wires 21b. Each of the second electric heating wires 21b is also in contact with a front surface of one first electric heating wire 21a of two adjacent first electric heating wires 21a and a back surface of the other first electric heating wire 21a of the two adjacent first electric heating wires 21a.

As will be described later, as long as the actuator wire 1 can be contracted and restored repeatedly, namely, as long as the net-shaped heating element 2 can follow the repeated contraction and restoration of the actuator wire 1, the net-shaped electric heating element 2 may be formed of any one of the braided electric heating wires 21, the knitted electric heating wires 21, or the weaved electric heating wires 21.

One end of the net-shaped electric heating element 2 is connected to one end of the actuator wire 1. As shown in FIG. 1, as one example, the one end of the actuator wire 1 is swaged with a connector 4 together with one end of the net-shaped electric heating element 2. In this way, the one end of the net-shaped electric heating element 2 is connected to the one end of the actuator wire 1 with a first connector 4a. An example of the connector 4 is a spade connector. The space connector may be a fork spade connector or a ring spade connector. In FIG. 1, a ring spade connector is illustrated as the first connector 4a. Likewise, the other end of the net-shaped electric heating element 2 is connected to the other end of the actuator wire 1 with a second connector 4b. As just described, it is desirable that the net-shaped electric heating element 2 is provided between the one end and the other end of the actuator wire 1. It is desirable that the connector 4 is formed of a metal. The reason therefor will be described.

(Controller 5)

The controller 5 supplies electric power to the net-shaped electric heating element 2 to heat the net-shaped electric heating element 2. The controller 5 may comprise an electric power source to supply electric power to the net-shaped electric heating element 2. The electric power supplied to the net-shaped electric heating element 2 may be alternating current or direct current. The controller 5 may comprise a switch. While the switch is turned on, the electric power is supplied to the net-shaped electric heating element 2. On the other hand, while the switch is turned off, the electric power is not supplied to the net-shaped electric heating element 2.

(Fabrication Method of the Actuator Device)

Hereinafter, the fabrication method of the actuator device according to the present invention will be described.

Figure 4:
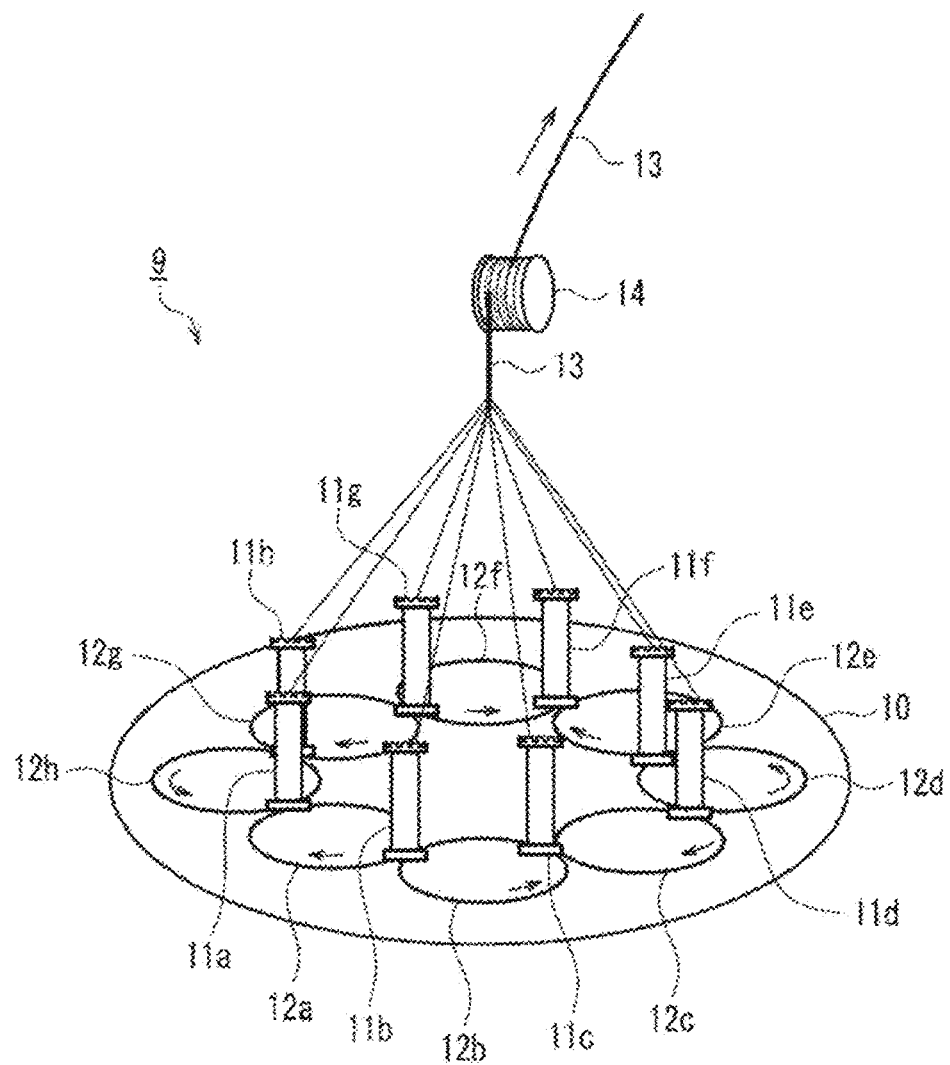
FIG. 4 shows a braiding machine disclosed in Kinugasa.

First, using a well-known braiding machine, the electric heating wires 21 are braided around the side surface of the actuator wire 1 to provide an actuator 3 comprising the actuator wire 1 and the net-shaped electric heating element 2 which covers the side surface of the actuator wire 1. FIG. 4 shows a braiding machine disclosed in Kinugasa (United States Patent Application Publiation No. 2016/0326675). In FIG. 4, the referential signs 9, 10, 11a-11h, 12a-12h, 13, and 14 indicate a braiding machine, a binding cord, bobbins (namely, carriers), circular tracks, a braid, and a guide roll, respectively. Sakurai et. al. disclose a braiding machine capable of winding fiber yarn helically around a wick in JP 2015-059276A.

Figure 5:
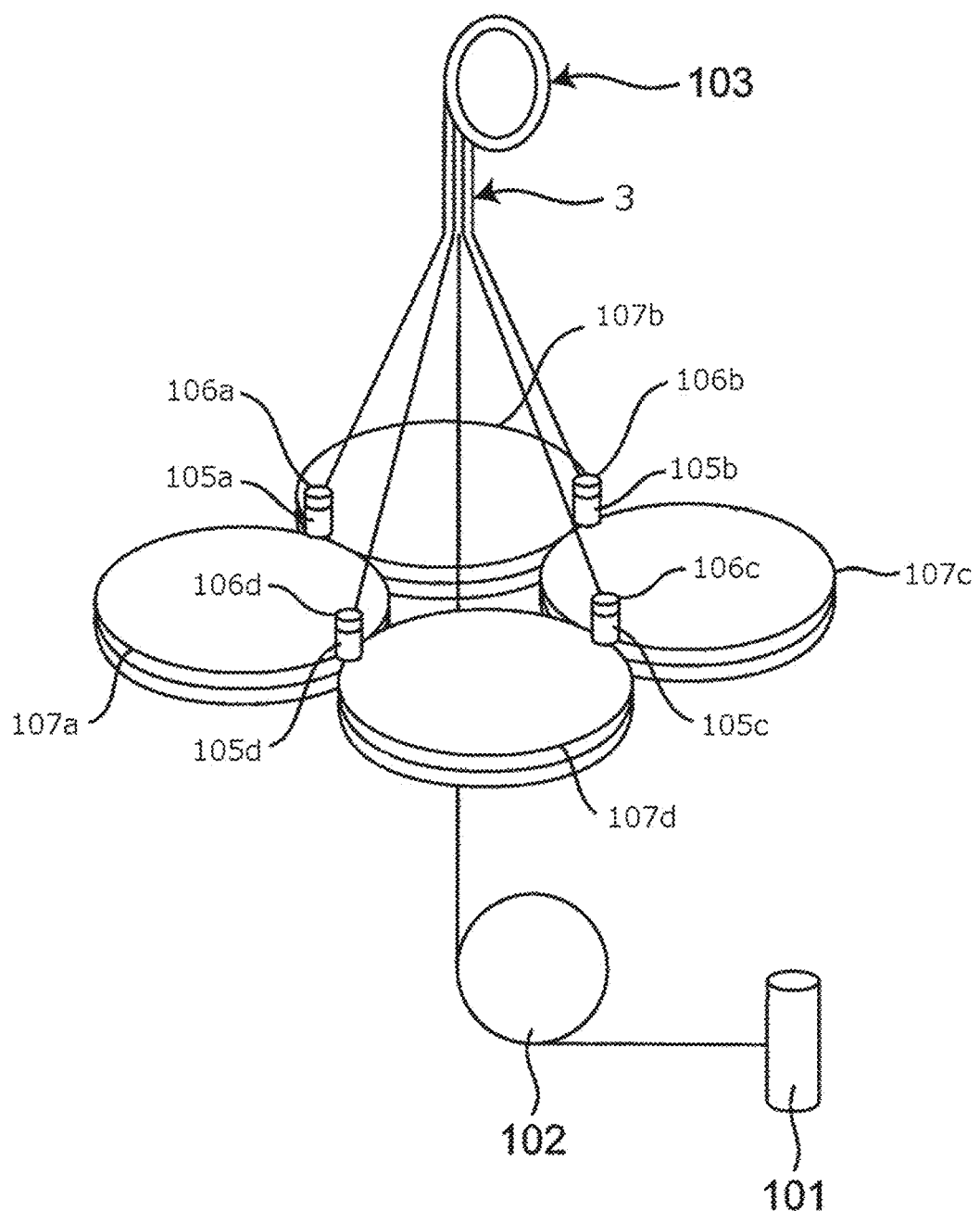
FIG. 5 shows a schematic view of a braiding machine used to produce the actuator.

FIG. 5 shows a schematic view of a braiding machine used to produce the actuator 3. In FIG. 5, the reference signs 101, 102, 103, 105a-105d, 106a-106d, and 107a-107d show a bobbin, a pulley, a rolling-up apparatus, bobbins, spindles, and circular tracks, respectively. The braiding machine shown in FIG. 5 is constituted by adding the bobbin 101 and the pulley 102 to a well-known braiding machine. The actuator wire 1 is supplied from the bobbin 101. The actuator wire 1 is guided with the pulley 102. Subsequently, while the electric heating wires 21 are supplied through the circular tracks 107 and the spindles 106 onto the side surface of the actuator wire 1, the actuator wire 1 is rolled up together with the electric heating wires 21. In this way, the actuator 3 comprising the actuator wire 1 and the net-shaped electric heating element 2 which is composed of the electric heating wires 21 covering the side surface of the actuator wire is provided.

The actuator 3 is cut in the desired length. The both ends of the actuator 3 cut in the desired length are swaged with the first connector 4a and the second connector 4b. In this way, an actuator member 68 is provided. Finally, using electric wires, the connectors 4 (i.e., the first connector 4a and the second connector 4b) are electrically connected to the controller 5. In this way, the actuator device 60 according to the present invention is provided.

(Operation of the Actuator Device 60)

Hereinafter, the operation of the actuator device 60 will be described.

As shown in FIG. 1, the actuator wire 1 is pulled taut, for example, with a weight 6. In other words, tension is applied to the actuator wire 1 along the longitudinal direction thereof with the weight 6.

FIG. 3A shows a schematic view of the actuator member 68 when the net-shaped electric heating element 2 is not heated. FIG. 3B shows a simple drawing of FIG. 3A. FIG. 3C shows a cross-sectional view taken along the line 3C-3C included in FIG. 3B. As shown in FIG. 3A, FIG. 3B, and FIG. 3C, when the net-shaped electric heating element 2 is not heated, the net-shaped electric heating element 2 is in contact with the side surface of the actuator wire 1. Since the net-shaped electric heating element 2 is in contact with the side surface of the actuator wire 1 just after the net-shaped electric heating element 2 is heated with the controller 5, the heat generated by the net-shaped electric heating element 2 is transferred efficiently to the actuator wire 1.

FIG. 3D shows a schematic view of the actuator member 68 after the net-shaped electric heating element 2 is heated to some extent. FIG. 3E shows a simple drawing of FIG. 3D. FIG. 3F shows a cross-sectional view taken along the line 3E-3E included in FIG. 3D. After the net-shaped electric heating element 2 is heated with the controller 5 to some extent the actuator wire 1 is contracted. For this reason, the net-shaped electric heating element 2 is moved away from the side surface of the actuator wire 1 as shown in FIG. 3E and FIG. 3F.

As just described, since the actuator wire 1 having the both ends connected to the both ends of the tubular net-shaped electric heating element 2 is contracted, the net-shaped electric heating element 2 is moved outward in such a manner that the center part of the net-shaped electric heating element 2 is moved from the side surface of the actuator wire 1 to the direction perpendicular to the longitudinal direction of the actuator wire 1. In other words, while the net-shaped electric heating element 2 is heated by the application of the electric power, the net-shaped electric heating element 2 is deformed in such a manner that the center part of the net-shaped electric heating element 2 is expanded.

In a narrow sense, the actuator wire 1 contracted during the heating is expanded slightly in a cross section taken along the longitudinal direction thereof. However, during the heating, the net-shaped electric heating element 2 is expanded much more than the actuator wire 1. In other words, the expansion rate in the cross section of the actuator wire 1 is much smaller than that of the net-shaped electric heating element 2. For this reason, the slight expansion in the cross section of the actuator wire 1 contracted by application of the heat may be omitted.

As just described, since the net-shaped electric heating element 2 is moved from the side surface of the actuator wire 1 during the heating, namely, since the center part of the net-shaped electric heating element 2 is expanded during the heating, the net-shaped electric heating element 2 is not in contact with the side surface of the actuator wire 1. Therefore, the actuator wire 1 is not burn out during or after the heating. Needless to say, the actuator wire 1 is prevented from being broken due to the heat.

As disclosed in the poster of Maki Hiraoka et. al., when the net-shaped electric heating element 2 is cooled down, the actuator wire 1 is restored. In other words, when the net-shaped electric heating element 2 is cooled down, the actuator wire 1 is extended in the longitudinal direction thereof to return to the original shape. For this reason, the tubular net-shaped electric heating element 2 is in contact with the side surface of the actuator wire 1. The net-shaped electric heating element 2 may be cooled naturally at room temperature. Alternatively, the net-shaped electric heating element 2 may be cooled with a cooler such as a Peltier device. The above-mentioned contraction and the restoration may be repeated.

Both of the ends of the tubular net-shaped electric heating element 2 are connected to both of the ends of the actuator wire 1 with the connectors 4. It is desirable that the connector 4 is formed of a metal, since the heat generated at the both ends of the net-shaped electric heating element 2 is released to air through the connectors 4 formed of the metal. For this reason, the both ends of the actuator wire 1 are not burn out due to the heat generated at the both ends of the net-shaped electric heating element 2.

EXAMPLES

Hereinafter, the present invention will be described in more detail to the following examples.

Inventive Example 1

(Fabrication of Actuator Wire 1)

In accordance with the disclosure of the preceding U.S. patent application Ser. No. 15/245,145, the present inventors obtained the coiled polymer fiber. Then, as shown in FIG. 2, the present inventors twisted two coiled polymer fibers to obtain the actuator wire 1. As just described, the actuator wire 1 was composed of two coiled polymer fibers twisted together. In other words, the side surface of the one twisted coiled polymer fiber was in contact with the side surface of the other twisted coiled polymer fiber.

(Fabrication of Net-shaped Electric Heating Element 2)

As apart from the actuator wire 1, the present inventors twisted silver-plating nylon yarn (purchased from Mitsufuji Corporation, trade name: AGPoss 30 denier) to obtain the electric heating wires 21 each having the number of twists of 250 T/m.

(Covering of Actuator Wire 1 with Net-shaped Electric Heating Element 2)

The present inventors covered the side surface of the actuator wire 1 with four electric heating wires 21 using the braiding machine shown in FIG. 5.

The present inventors cut the actuator wire 1 covered with the electric heating wires 21 to obtain the actuator 3 having a length of approximately 240 millimeters. In this way, the present inventors obtained the actuator 3 composed of the actuator wire 1 and the net-shaped electric heating element 2 which covered the side surface of the actuator wire 1.

(Connection with Connector 4)

The present inventors swaged the both ends of the actuator 3 with the metallic first ring spade connector 4a and the metallic second ring spade connector 4b. In this way, the present inventors obtained the actuator member 68.

(Heating Examination)

Figure 6:
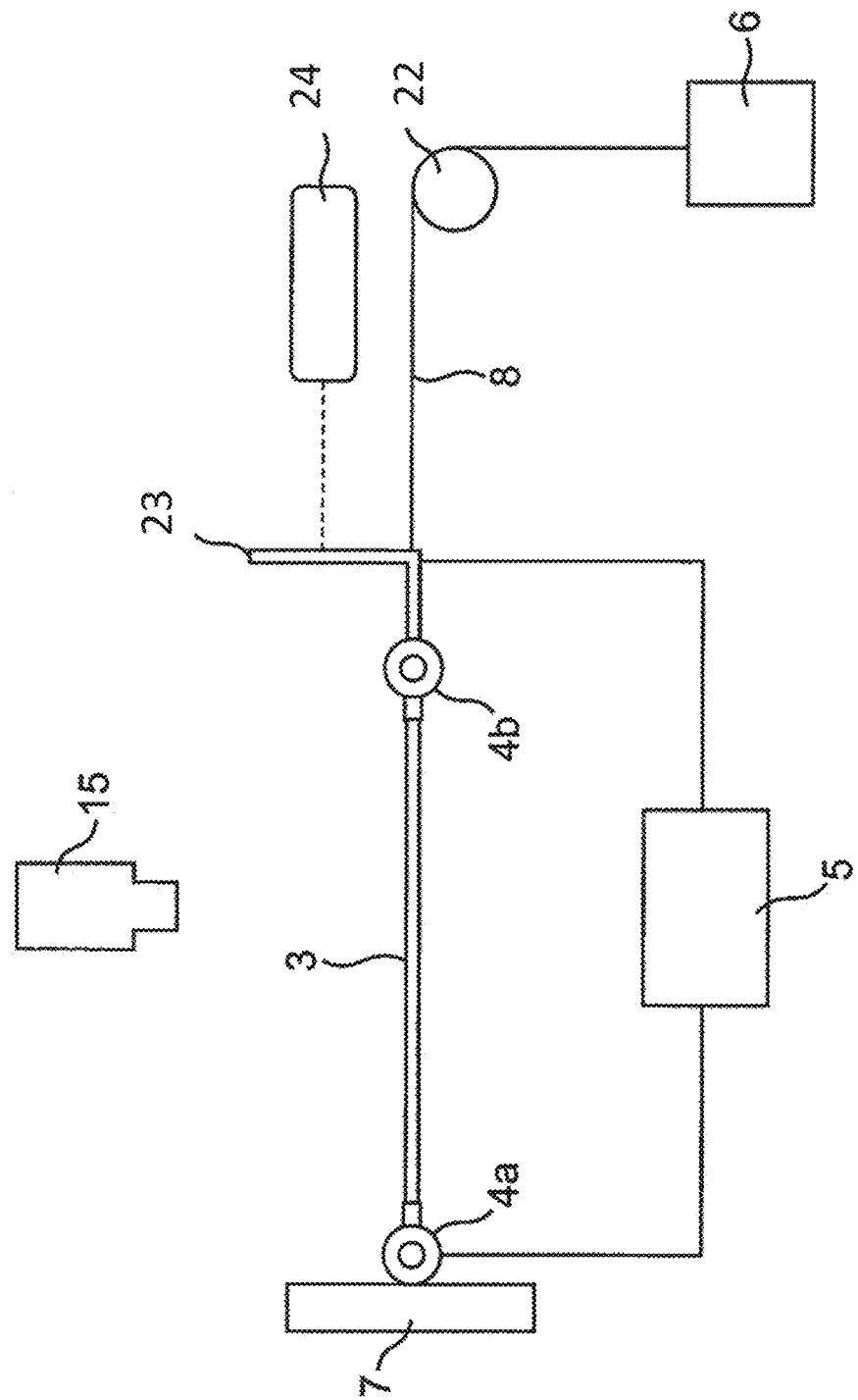
FIG. 6 shows a schematic view of an examination device used in a heating examination.

The heating examination of the actuator member 68 was conducted as below. FIG. 6 shows a schematic view of the examination device used in the heating examination. The first ring spade connector 4a was fixed with a stationary board 7. The weight 6 of 50 grams was attached to the second ring spade connector 4b with a cord 8. The weight 6 made the actuator wire 1 taut. The cord 8 was guided with the pulley 22. A mirror 23 was further attached to the second ring spade connector 4b. In this way, the first ring spade connector 4a was fixed, whereas the second ring spade connector 4b was disposed oscillatably along the longitudinal direction of the actuator wire 1. Note that the net-shaped electric heating element 2 is omitted in FIG. 6.

As shown in FIG. 6, the present inventors connected the first ring spade connector 4a and the second ring spade connector 4b electrically to the controller 5. Using the controller 5, an electric current of 90 milliamperes flowed through the net-shaped electric heating element 2 during a heating time of 60 seconds. In this way, the side surface of the actuator wire 1 was heated. The actuator wire 1 was contracted in the longitudinal direction thereof by the application of the heat. Then, no electric current flowed through the net-shaped electric heating element 2 during a cooling time of 90 seconds. In this way, the side surface of the actuator wire 1 was cooled naturally at room temperature.

During the cooling, the actuator wire 1 was extended in the longitudinal direction thereof by the release of the heat. As a result, the actuator wire 1 was restored. The heating and cooling were repeated three times. The mirror 23 was oscillated in the longitudinal direction of the actuator wire 1 together with the contraction and restoration of the actuator wire 1. The oscillation of the mirror 23 was measured with a laser displacement meter 24 (purchased from Keyence Corporation, trade name: LK-080). The temperature of the side surface of the actuator wire 1 was measured with a radiation thermometer 15 (purchased from Apiste Corporation, trade name: FSV-210).

Figure 7:
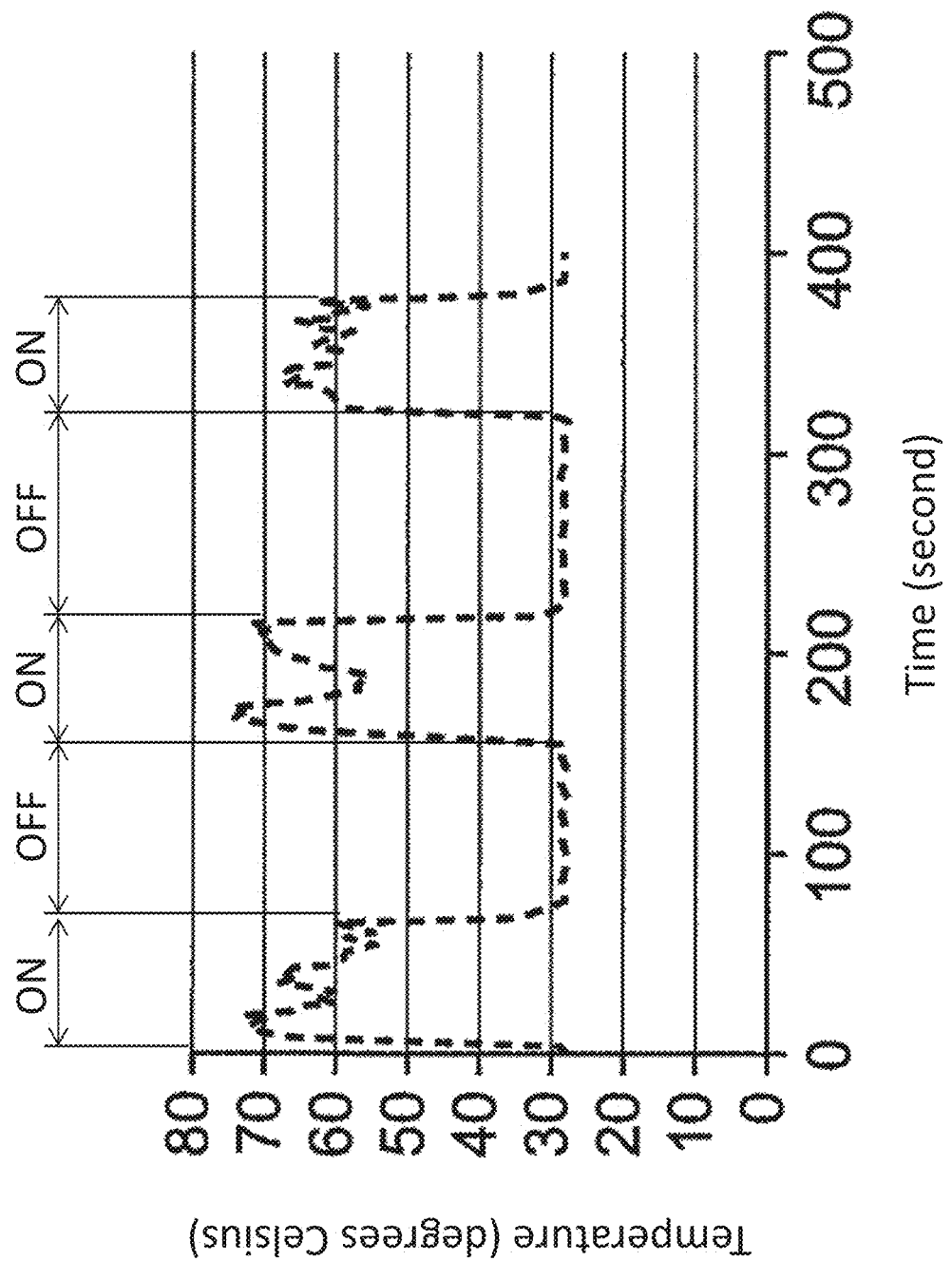
FIG. 7 is a graph showing temperature of a side surface of the actuator wire measured with a radiation thermometer.

FIG. 7 is a graph showing the temperature of the side surface of the actuator wire 1 measured with the radiation thermometer 15. As is clear from FIG. 7, after the temperature of the side surface of the actuator wire 1 reaches approximately 70 degrees Celsius, the temperature of the side surface of the actuator wire 1 starts to decrease. This means the net-shaped electric heating element 2 was moved from the side surface of the actuator wire 1. While the electric current flowed through the net-shaped electric heating element 2, the temperature of the side surface of the actuator wire 1 was maintained within the range of not less than approximately 60 degrees Celsius and not more than approximately 70 degrees Celsius.

Figure 8:
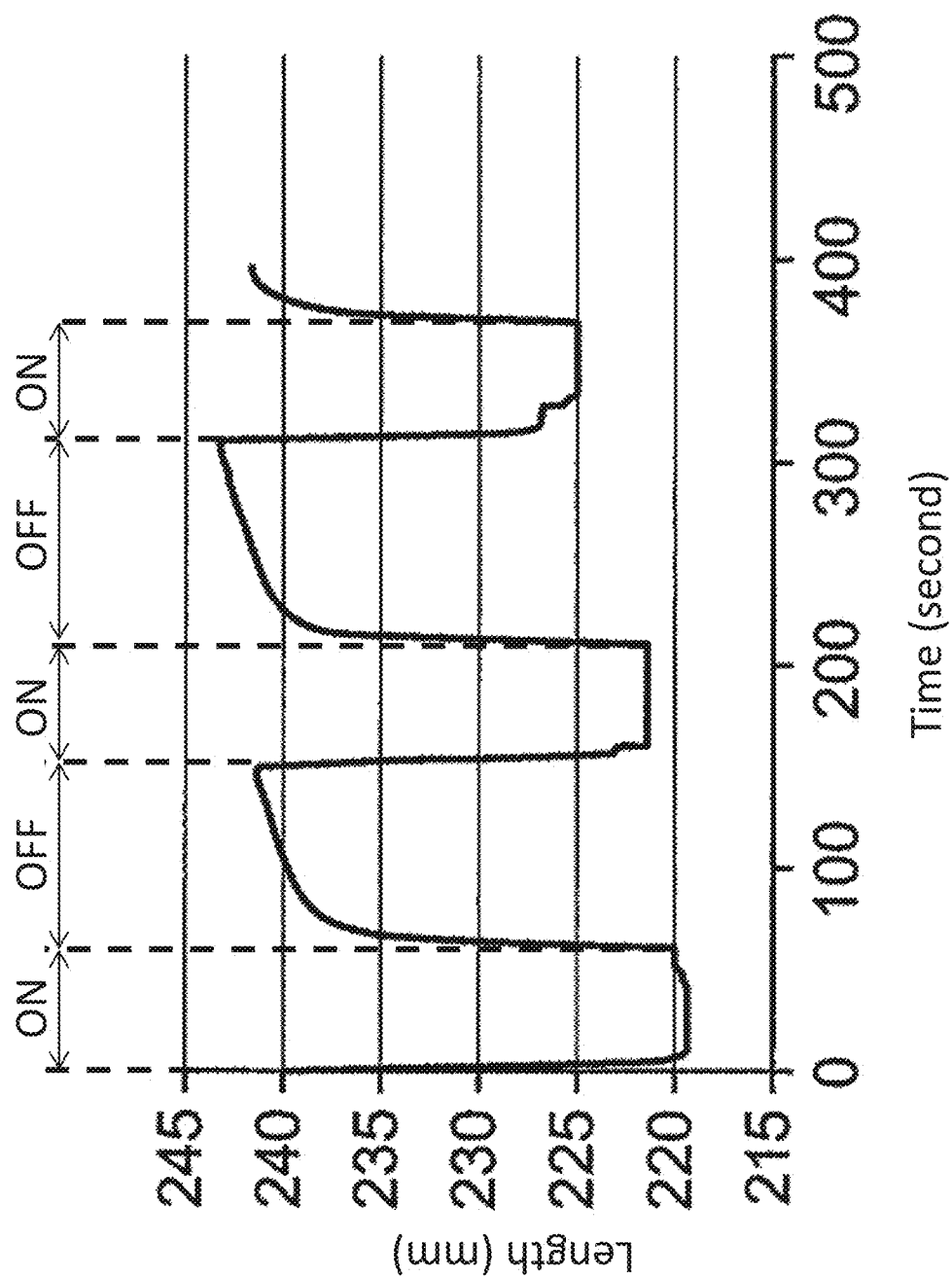
FIG. 8 shows a graph showing a length of the actuator wire measured with a laser displacement meter.

FIG. 8 shows a graph showing the length of the actuator wire 1 measured with the laser displacement meter 24. As is clear from FIG. 8, while the electric current flowed through the net-shaped electric heating element 2, namely, while the actuator wire 1 was heated, the actuator wire 1 was shortened to have a length of 220 millimeters. On the other hand, while the actuator wire 1 was not heated, the actuator wire 1 was restored to have the original length of 240 millimeters.

Comparative Example 1

Figure 9A:
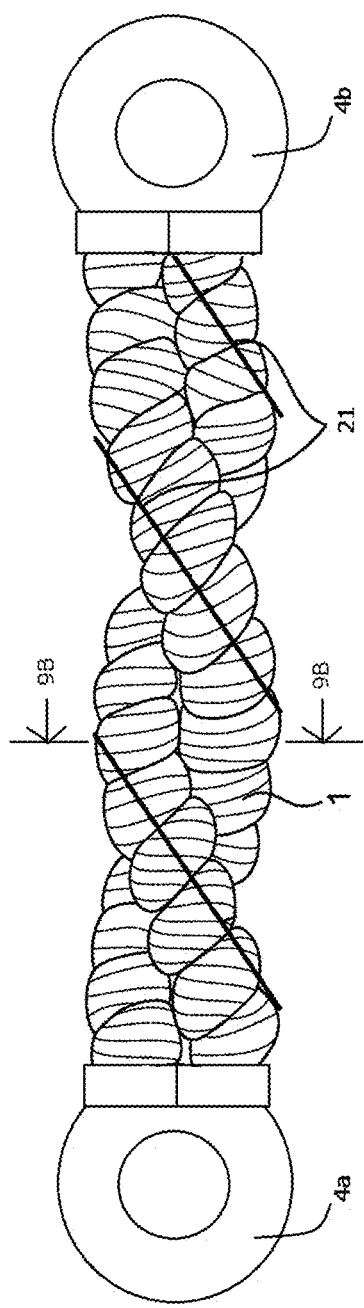
FIG. 9A shows a schematic view of the actuator member used in the comparative example 1.

In the comparative example 1, an experiment similar to the inventive example 1 was conducted except that the heating element 2 was not net-shaped and was one electric heating wire 21. In other words, in the comparative example 1, as shown in FIG. 9A, one electric heating wire 21 was formed around the actuator wire 1 so as to wind helically on the side surface of the actuator wire 1. In the comparative example 1, the electric current of 70 milliamperes flowed.

Figure 9B:
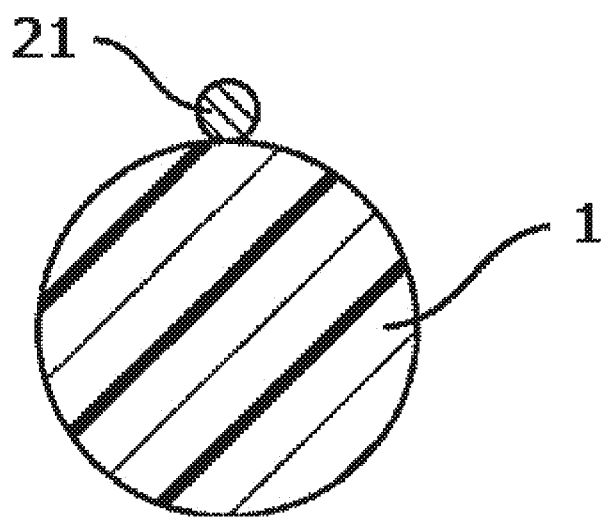
FIG. 9B shows a cross-sectional view taken along the line 9B-9B included in FIG. 9A.
Figure 9C:
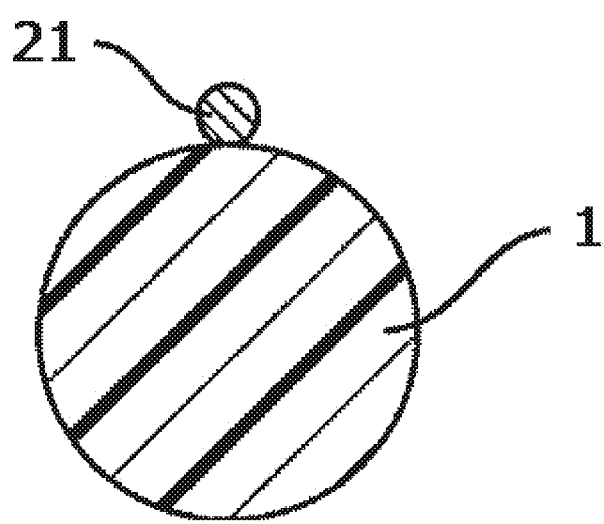
FIG. 9C shows a cross-sectional view when the electric current flows through the heating wire.

FIG. 9B shows a cross-sectional view taken along the line 9B-9B included in FIG. 9A. In FIG. 9B, no electric current flowed through the electric heating wire 21. FIG. 9C shows a cross-sectional view when the electric current flows through the electric heating wire 21. As shown in FIG. 9B and FIG. 9C, regardless of present or absent of the current flowing through the electric heating wire 21, the electric heating wire 21 was in contact with the side surface of the actuator wire 1. For this reason, after the elapse of approximately 32 seconds from the start of the heating, the actuator wire 1 was broken.

Figure 10:
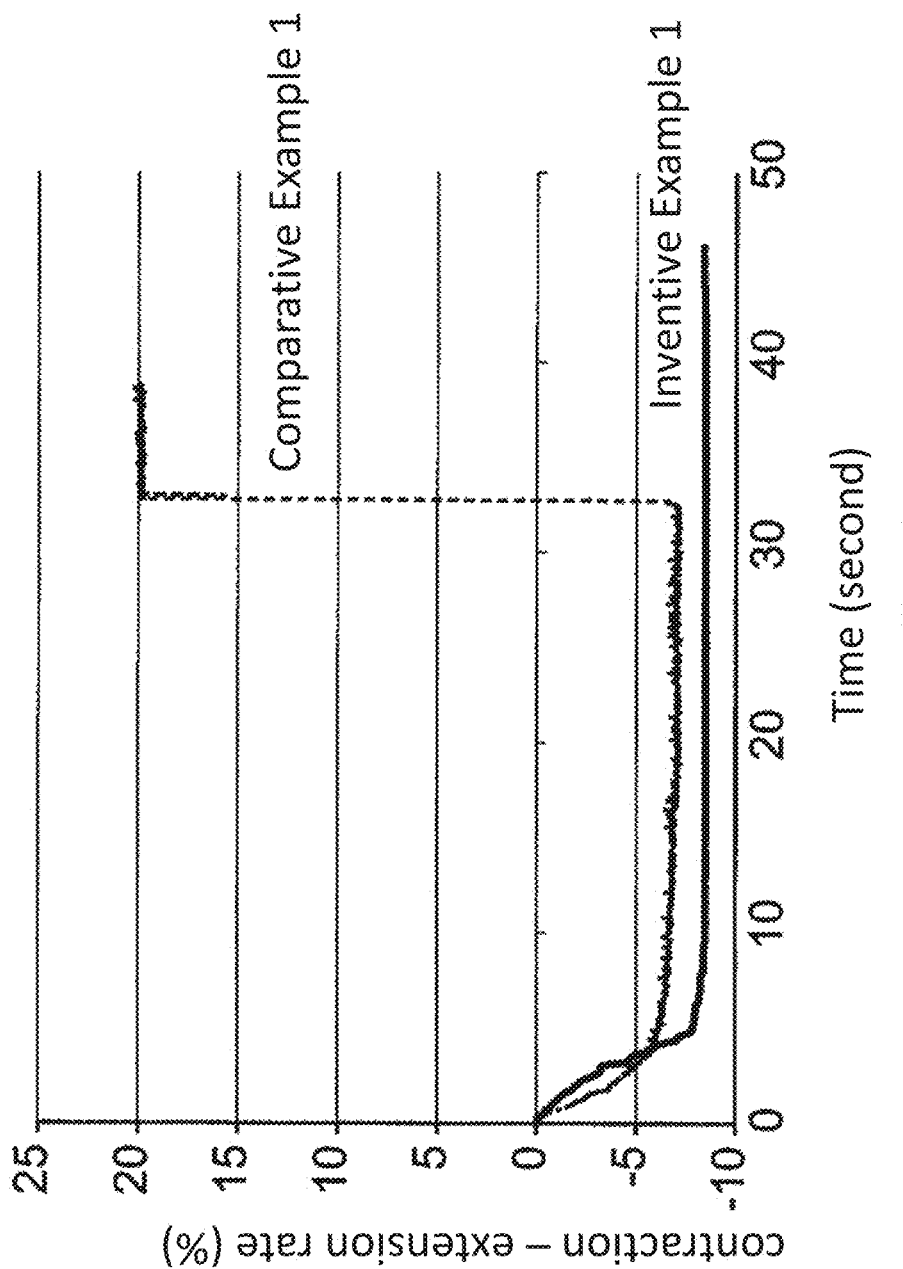
FIG. 10 is a graph showing a contraction—extension rate of the actuator wires according to the inventive example 1 and the comparative example 1.

FIG. 10 is a graph showing contraction—extension rate (i.e., a contraction—restoration rate) of the actuator wires 1 according to the inventive example 1 and the comparative example 1. As shown in FIG. 10, during the period from the start of the heating to the time when 30 seconds elapsed therefrom, the contraction—extension rate was minus 5%—minus 10%. In other words, the actuator wire 1 was contracted by 5%—10%. However, in the comparative example 1, at the time when 32 seconds elapsed from the start of the heating, the contraction—extension rate was suddenly increased to plus 20%. This means that the actuator wire 1 was broken.

FIG. 11 is a graph showing the temperature of the side surfaces of the actuator wires 1 according to the inventive example 1 and the comparative example 1. As is clear from FIG. 11, in the inventive example 1, the temperature of the side surface of the actuator wire 1 was always approximately 75 degrees Celsius or less. On the other hand, in the comparative example 1, at the time when 32 seconds elapsed from the start of the heating, the temperature of the side surface of the actuator wire 1 rose suddenly over 90 degrees Celsius. This means that the actuator wire 1 was broken.

INDUSTRIAL APPLICABILITY

The actuator device according to the present invention can be used as an artificial muscle.

REFERENTIAL SIGNS LIST

1 Actuator wire
2 Electric heating element
21 Electric Heating wire
3 Actuator
4a First connector
4b Second connector
5 Controller
6 Weight
7 Stationary board
8 Cord
9 Braiding machine
10 Binding cord
11 Bobbins
12 Circular track
13 Braid
14 Guide roll
15 Radiation thermometer
22 Pulley
23 Mirror
24 Laser displacement meter
60 Actuator device
68 Actuator member
101 Bobbin
102 Pulley
103 Rolling-up apparatus
105 Bobbin
106 Spindle
107 Circular track
111a One twisted coiled polymer fiber
111b other twisted coiled polymer fiber Incorporation of the Preceding Application Just for reference, the contents of "SUMMARY", "DETAILED DESCRIPTION OF THE EMBODIMENT", AND "EXAMPLES" included in the preceding U.S. patent application Ser. No. 15/245,145 will be copied below. In order to distinguish from the referential signs used in the present application, hereinafter, the numeral number "9" is added to the first letter of each of the referential signs used in the preceding U.S. patent application Ser. No. 15/245,145. For example, the referential sign "111" included in the preceding U.S. patent application Ser. No. 15/245,145 means fiber; however, hereinafter, the referential sign "9111" is assigned for the fiber in the present application.

The term "fiber" used in the preceding U.S. patent application Ser. No. 15/245,145 corresponds to the "actuator wire 1" used in the present application.

The term "temperature regulator" used in the preceding U.S. patent application Ser. No. 15/245,145 corresponds to the "net-shaped electric heating element 2" used in the present application.

(Summary Included in the Preceding Application)

The present invention provides an actuator, comprising:
a fiber; and
a temperature regulator capable of at least one of heating and cooling the fiber, wherein
the fiber is twisted around a longitudinal axis thereof;
the fiber is folded so as to have a shape of a cylindrical coil;
the fiber is formed of linear low-density polyethylene; and
the following mathematical formula (I) is satisfied:

$$D/d<1 \tag{I}$$

where
D represents a mean diameter of the cylindrical coil; and
d represents a diameter of the fiber.

The spirits of the present invention includes a method for extending and contracting a fiber; the method comprising:
(a) heating the fiber to contract the fiber; wherein
the fiber is twisted around a longitudinal axis thereof;
the fiber is folded so as to have a shape of a cylindrical coil;
the fiber is formed of linear low-density polyethylene;
the following mathematical formula (I) is satisfied:

$$D/d<1 \tag{I}$$

where
D represents a mean diameter of the cylindrical coil; and
d represents a diameter of the fiber; and
the fiber is contracted along an axis direction of the cylindrical coil; and
(b) cooling the fiber to extend the fiber; wherein
the fiber is extended along the axis direction of the cylindrical coil.

(Detailed Description of the Embodiment Included in the Preceding Application)

(Terms)

First, the reference numbers added to the term "fiber" in the instant specification will be defined as below.

The term "fiber 9111a" means a fiber which is neither twisted nor folded. See FIG. 13A. The fiber 9111a may be referred to as "extended fiber 9111a".

The term "fiber 9111b" means a fiber which is twisted, however, is not folded. See FIG. 13B. The fiber 9111b may be referred to as "twisted fiber 9111b".

The term "fiber 9111c" means a fiber which is twisted and folded. See FIG. 13C. The fiber 9111c may be referred to as "folded fiber 9111c".

The term "fiber 9111" comprehensively includes the fibers 9111a-9111c.

In the instant specification, there is not a fiber which is folded, however, is not twisted.

(Embodiment)

Figure 12A:
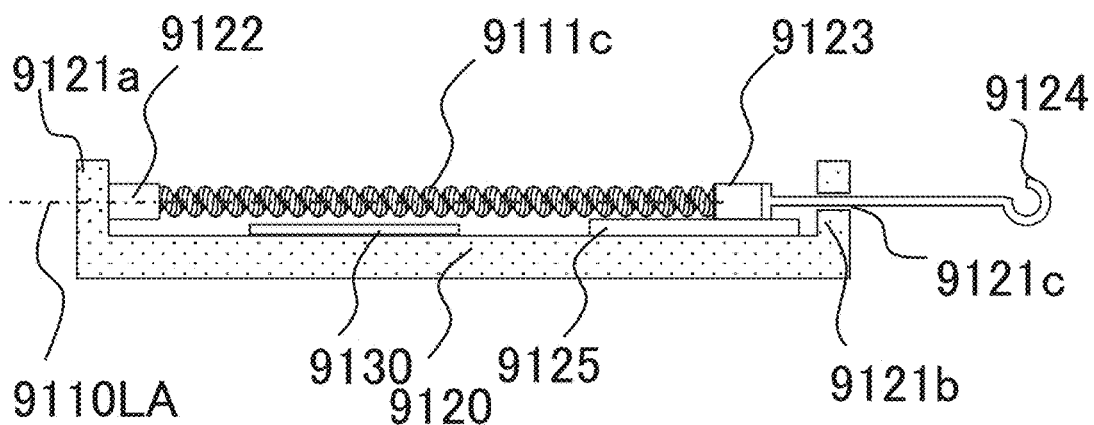
FIG. 12A shows a cross-sectional view of an actuator according to the present embodiment in the preceding application.

As shown in FIG. 12A, an actuator according to the present embodiment comprises a fiber 9111c consisting of linear low-density polyethylene and a temperature regulator 9130. The temperature regulator 9130 is capable of at least one of heating and cooling the fiber 9111c.

(Fiber)

The fiber 9111c is twisted around the longitudinal axis thereof. The fiber 9111c is folded so as to have a helix shape. In other words, the fiber 9111c is folded so as to have a shape of a cylindrical coil.

First, a method for fabricating the fiber 9111c used in the present embodiment will be described with reference to FIG. 13A-FIG. 13C.

Figures 13A, 13B:
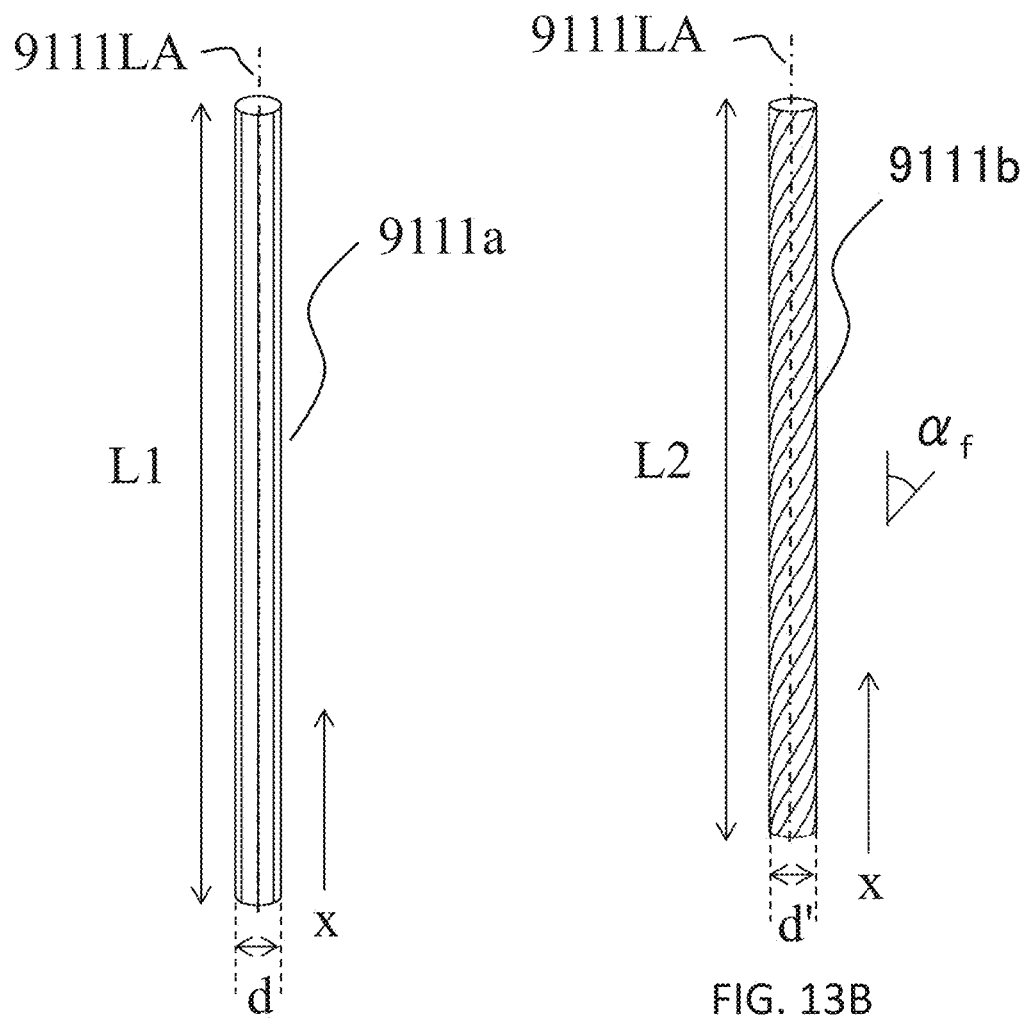
FIG. 13A shows a schematic view of a fiber 111a which is neither twisted nor folded in the preceding application.
FIG. 13B shows a schematic view of a fiber 111b which is twisted, however, is not folded in the preceding application.

As shown in FIG. 13A, a fiber 9111a having a length of L1 and a diameter of d is prepared. Needless to say, the fiber 9111a is elongate and has a fiber axis 9111LA. In FIG. 13A, the fiber 9111a is neither twisted nor folded yet. The fiber axis 9111LA is also a central axis of the fiber 9111a and parallel to the x-axis direction.

Next, as shown in FIG. 13B, the fiber 9111a is twisted. In this way, the fiber 9111b is obtained. More specifically, one end of the fiber 9111a is twisted around the fiber axis 9111LA, while the other end of the fiber 9111a is fixed so as not to be twisted around the fiber axis 9111LA. In this way, the twisted fiber 9111b is obtained. In FIG. 13B, the fiber 9111b is twisted, however, is not yet folded. The fiber 9111b has a length of L2. The fiber 9111b has a diameter d' which is slightly greater than the diameter d. The fiber axis 9111LA is parallel to the x-axis direction. The value of L2 is equal to or less than the value of L1.

The above-mentioned twists are continued in such a way that the one end of the fiber 9111b is rotated many times around the fiber axis 9111LA. As a result, as shown in FIG. 13C, the fiber 9111 is folded while being rotated. More specifically, the fiber 9111 is folded so as to have a length of L3 which is smaller than L1 and to have a mean diameter of D which is more than d. Also in this stage, the other end of the fiber 9111 is fixed so as not to be twisted around the fiber axis 9111LA. In this way, the fiber 9111c which is twisted and folded is obtained. An angle $\alpha_f$ shown in FIG. 13B represents a fiber bias angle. The fiber bias angle $\alpha_f$ is a twist angle of the fiber 9111 with regard to the fiber axis 9111LA. The mean diameter D is obtained by subtracting the diameter d of the fiber from the external diameter D' of the cylindrical coil.

Figure 13C:
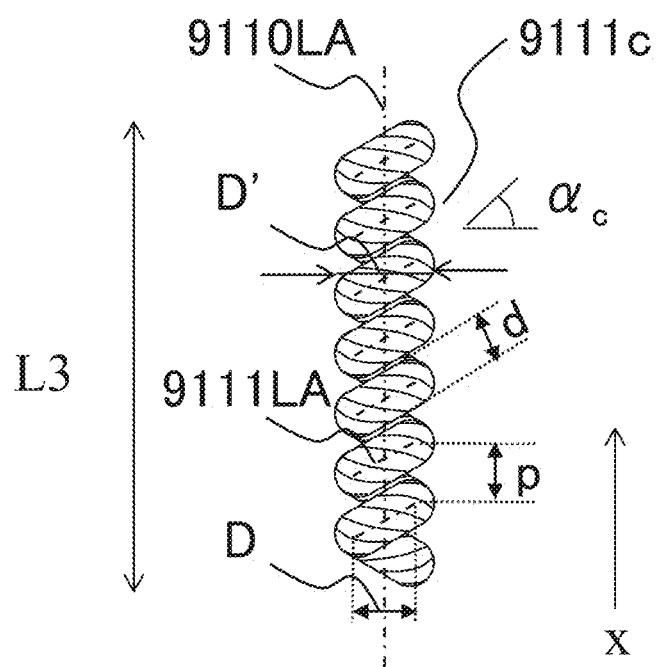
FIG. 13C shows a schematic view of a fiber 111c which is twisted and folded in the preceding application.

As shown in FIG. 13C, after the fiber 9111 is folded, the fiber axis 9111LA is no longer parallel to the x axis. The folded fiber 9111c has a helix shape. In other words, the folded fiber 9111c has a shape of a cylindrical coil. In other words, the folded fiber 9111c has a shape of a spring. As shown in FIG. 13C, the coil has a pitch of p. The pitch p is equal to one period of the coil. See FIG. 13D.

Figure 13D:
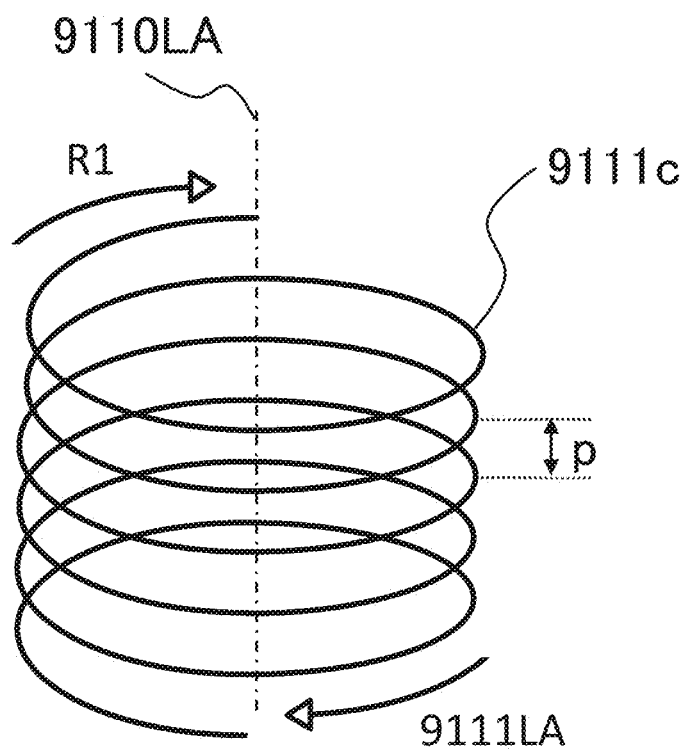
FIG. 13D shows a schematic view of a cylindrical coil formed of the folded fiber 111c in the preceding application.

As shown in FIG. 13D, the rotation direction R1 of the helix (i.e., the rotation direction R1 of the cylindrical coil) accords with the fiber axis 9111LA of the folded fiber 9111c. Needless to say, when the fiber 9111 is twisted clockwise around the fiber axis 9111LA in FIG. 13B, the fiber 9111 is folded with rotating clockwise in FIG. 13C. Similarly, when the fiber 9111 is twisted counterclockwise around the fiber axis 9111LA in FIG. 13B, the fiber 9111 is folded with rotating counterclockwise in FIG. 13C.

The cylindrical coil formed of the folded fiber 9111c has a mean diameter of D. The cylindrical coil has a longitudinal axis 9110LA. Hereinafter, the longitudinal axis 9110LA of the cylindrical coil is referred to as a coil axis 9110LA.

An angle $\alpha_c$ shown in FIG. 13C represents a coil bias angle. The coil bias angle $\alpha_c$ is formed between a plane perpendicular to the coil axis 9110LA and the fiber axis 9111LA of the folded fiber 9111c.

In the present embodiment, the fiber 9111 is formed of linear low-density polyethylene (hereinafter, referred to as "L-LDPE"). Since the fiber 9111 is formed of linear low-density polyethylene, the folded fiber 9111c has a spring index C of less than 1.

As well known, the spring index C is represented by the following mathematical formula (I):

$$C=D/d$$

where

D represents a mean diameter of the cylindrical coil formed of the folded fiber 9111c, and d represents a diameter of the fiber 9111.

It gets harder to extend the cylindrical coil with a decrease in the spring index C. In other words, the amount of the extension of the cylindrical coil is smaller with a decrease in the spring index C, in a case where a force F applied to the cylindrical coil along the axis direction (i.e., the longitudinal direction) of the cylindrical coil is constant.

On the other hand, the cylindrical coil is extended easily with an increase in the spring index C. In other words, the amount of the extension of the cylindrical coil is greater with an increase in the spring index C, in a case where a force F applied to the cylindrical coil along the axis direction (i.e., the longitudinal direction) of the cylindrical coil is constant.

Therefore, a cylindrical coil having a high spring index C is "soft" and a cylindrical coil having a low spring index C is "stiff". When the number of the twist of the fiber 9111 around the fiber axis 9111LA is increased, namely, when the number of the rotation of the fiber 9111 around the fiber axis 9111LA is increased, the spring index C of the obtained cylindrical coil is decreased. However, when the number of the twist (i.e., the number of the rotation) is increased too much, the fiber 9111 is broken.

It is difficult to form a cylindrical coil having a spring index C of less than 1 by twisting a fiber formed of a resin other than linear low-density polyethylene (e.g., low-density polyethylene, high-density polyethylene, or nylon 66). This is because the fiber formed of a resin other than linear low-density polyethylene (e.g., low-density polyethylene) is broken due to its low durability against the load generated inside by the twist before the spring index C reaches less than 1. Alternatively, this is because the fiber formed of a resin other than linear low-density polyethylene (e.g., high-density polyethylene or nylon 66) has a spring index C of 1 or more. For more detail, see the examples and the comparative examples which will be described later.

The present inventors found through experiments that a fiber formed of linear low-density polyethylene is not broken even if its spring index C is less than 1.

A typical coil formed of metal may have a spring index C of not less than 4 and not more than 22 in light of its performance and manufacturing easiness. However, in the present embodiment, the cylindrical coil is formed of linear low-density polyethylene and has a small spring index C of less than 1. The small spring index C of less than 1 is required to achieve a high displacement rate which will be described later.

Linear low-density polyethylene may have a density of not less than 0.915 g/cm$^3$ and not more than 0.925 g/cm$^3$ and a weight-average molecular weight of not less than 50 kg/mol and not more than 200 kg/mol. Linear low-density polyethylene is composed of ethylene monomer units each represented by the chemical structural formula —(CH$_2$—CH$_2$)$_n$— (where n is a natural number) and α-olefin monomer units each represented by the chemical structural formula —(CH$_2$—CHR)$_m$— (where m is a natural number, and R represents a hydrocarbon group).

The molar ratio of the α-olefin monomer units to the ethylene monomer units may be not less than 2.5% and not more than 3.5%. In other words, the value of m/n may be not less than 0.025 and not more than 0.035. Each of the α-olefin monomer units may have a carbon number of not less than 4 and not more than 8. An example of R is —CH$_2$CH$_3$, —CH$_2$CH$_2$CH$_2$CH$_3$, —CH$_2$CH(CH$_3$)CH$_3$, or —CH$_2$CH$_2$CH$_2$CH$_2$CH$_2$CH$_3$.

(Base 9120)

As shown in FIG. 12A, the actuator according to the present embodiment may comprise a plate-like base 9120. The plate-like base 9120 comprises a first protrusion 9121a at one end thereof. The one end of the folded fiber 9111c is fixed to the first protrusion 9121a through a holding fixture 9122. The plate-like base 9120 comprises a second protrusion 9121b at the other end. The other end of the folded fiber 9111c is connected to one end of a rod 9123. The second protrusion 9121b has a through hole 9121c. The rod 9123 penetrates the through hole 9121c. The rod 9123 has a hook 9124 at the other end thereof.

Figure 12B:
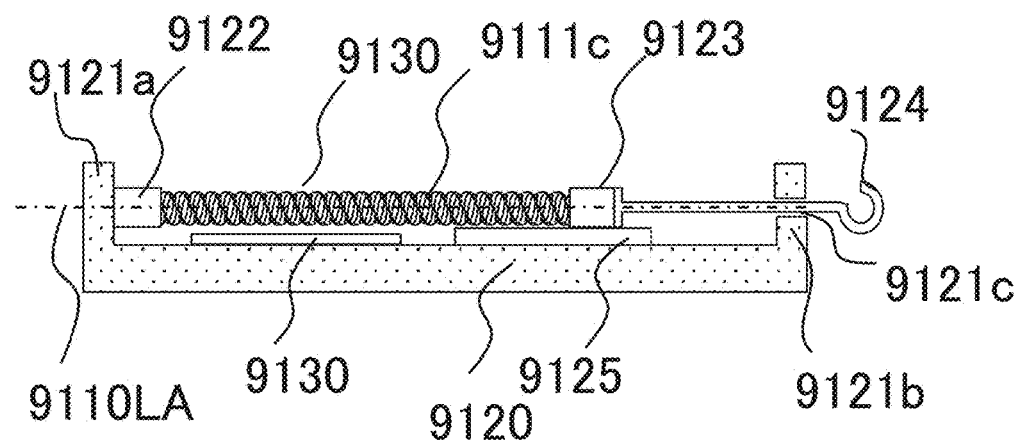
FIG. 12B shows a cross-sectional view of the actuator in the state where a fiber is contracted in the preceding application.

A plate-like slider 9125 is located slidably on the plate-like base 9120 between the plate-like base 9120 and the one end of the rod 9123. The plate-like slider 9125 moves along the coil axis 9110LA together with the extension and the contraction of the cylindrical coil formed of the folded fiber 9111c. More specifically, when the folded fiber 9111c is heated, as shown in FIG. 12B, the plate-like slider 9125 also moves along the coil axis 9110LA. In place of or together with the plate-like slider 9125, a pulley or a guide tube may be used.

In FIG. 12A, the actuator comprises one fiber 9111c. The actuator may comprise two or more fibers 9111c. One fiber 9111b may be obtained by integrally twisting two or more fibers 9111a which are arranged parallel. One fiber 9111c may be obtained by integrally twisting two or more twisted fibers 9111b which are arranged parallel.

In order to prevent the twist and the fold of the fiber 9111c from loosening, it is desirable that one end of the fiber 9111c is fixed. In other words, it is desirable that the one end of the fiber 9111c is fixed by the folding fixture 9122.

(Temperature Regulator 9130)

An example of the temperature regulator 9130 is a heater or a cooler. The temperature regulator 9130 may have at least one of the heater and the cooler. The temperature regulator 9130 may have both of the heater and the cooler. An example of the cooler is a Peltier element. Hot water or cold water may be supplied to heat or cool the fiber 9111c.

As shown in FIG. 12A, the temperature regulator 9130 may be located between the fiber 9111c and the plate-like base 9120. In this case, the temperature regulator 9130 has a shape of a thin plate. In other words, at least one of a heater and a Peltier element having a shape of a thin plate may be located between the fiber 9111c and the plate-like base 9120.

Figure 13E:
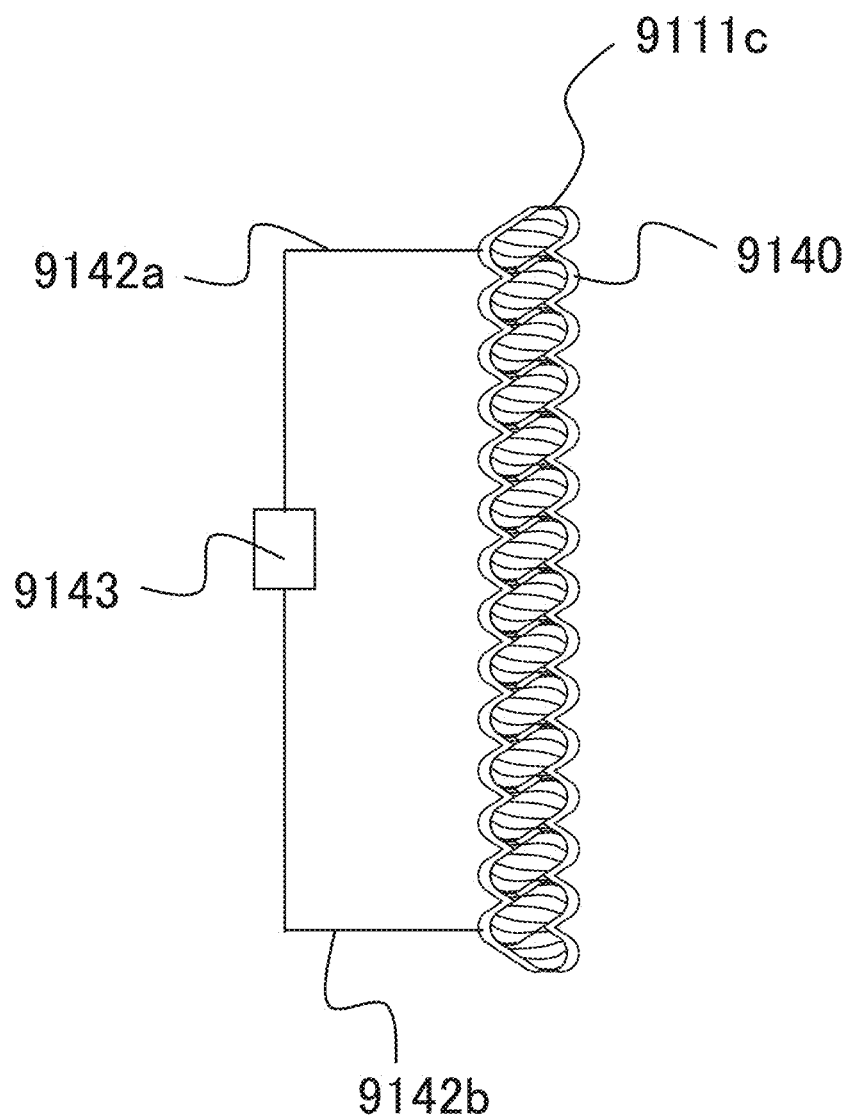
FIG. 13E shows a schematic view of the fiber 111c coated with a metal film 140 in the preceding application.

As shown in FIG. 13E, the fiber 9111c may be coated with a metal film 9140. Electric wires 9142a and 9142b are electrically connected to the surfaces located at one end and the other end of the fiber 9111c, respectively. Electric energy may be supplied through the electric wires 9142a and 9142b from a controller 9143 which functions as the temperature regulator 9130 to the metal film 9140.

The temperature regulator 9130 having the metal film 9140 may be used in combination with the Peltier element. For example, the metal film 9140 is heated by supply of electric energy, and thereby the fiber 9111c is heated. The Peltier element having a shape of a thin plate cools the fiber 9111c. The electric energy required for the Peltier element may be supplied from the controller 9143.

(Actuator Operation)

Figures 14, 15:
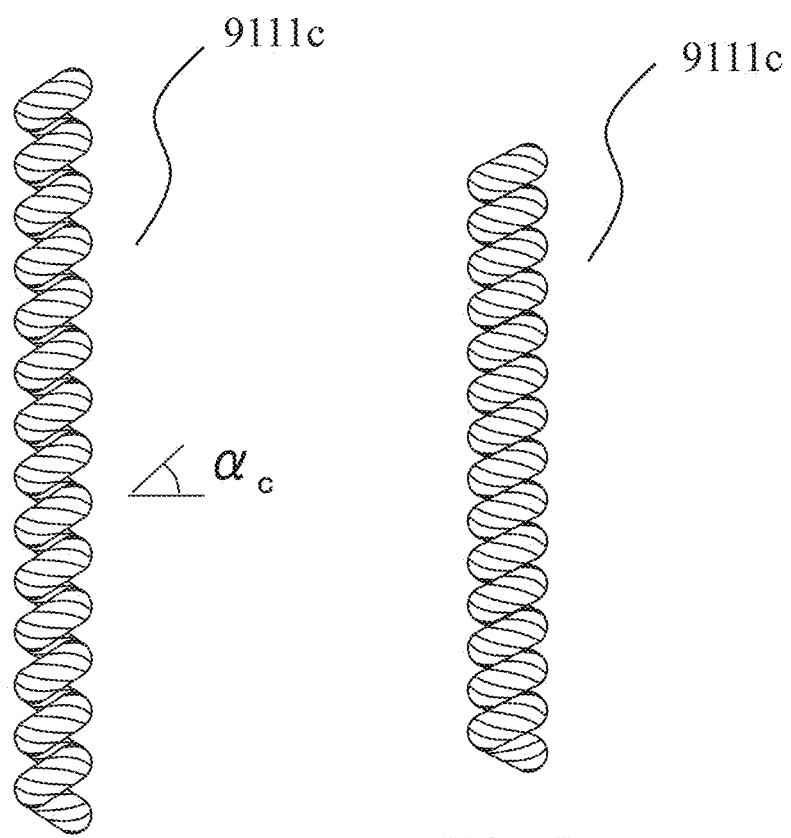
FIG. 14 shows a schematic view of a state of the fiber 111c before the fiber 111c is heated in the preceding application.
FIG. 15 shows a schematic view of a state of the fiber 111c after the fiber 111c is heated in the preceding application.

When the cylindrical coil formed of the folded fiber 9111c is heated, the cylindrical coil is contracted along the coil axis 9110LA. More specifically, when the fiber 9111c is heated, the coil bias angle $\alpha_c$ is decreased. For this reason, the pitch p of the cylindrical coil is decreased. Compare FIG. 15 which shows the state of the fiber 9111c after the fiber is heated to FIG. 14 which shows the state of the fiber 9111c before the fiber 9111c is heated. In this way, the folded fiber 9111c having a shape of a cylindrical coil is contracted along the coil axis 9110LA. When the fiber 9111c is cooled, the fiber 9111c is extended along the coil axis 9110LA.

The cylindrical coil formed of the folded fiber 9111c may be heated to a temperature of more than 30 degrees Celsius and not more than 100 degrees Celsius. In case of not more than 30 degrees Celsius, since the fiber 9111c is heated insufficiently, the folded fiber 9111c would not be contracted. In case of more than 100 degrees Celsius, the fiber 9111c may be melted. It is desirable that the cylindrical coil is heated within a range of not less than 50 degrees Celsius and not more than 90 degrees Celsius.

The heated fiber 9111c is cooled to a temperature of not more than 30 degrees Celsius. The fiber 9111c may be cooled naturally under room temperature. Alternatively, the fiber 9111c may be cooled by the cooler such as a Peltier element. The above-mentioned heating and cooling may be repeated.

As demonstrated in the examples which will be described later, the present inventors found that the fiber 9111c formed of linear low-density polyethylene has a high displacement rate DR of not less than 0.38×10$^{-2}$/° C., compared to a case where the folded fiber 9111c is formed of another resin.

The displacement rate DR is defined by the following mathematical formula (I).

$$\text{(Displacement Rate DR)} = (x-y)/(x \cdot \Delta T) \quad \text{(I)}$$

where x represents a length of the fiber along the axis direction of the cylindrical coil before the fiber is heated, y represents a length of the fiber along the axis direction of the cylindrical coil after the fiber is heated, and ΔT represents a temperature difference of the folded fiber between before and after the fiber is heated.

As just described, when the folded fiber 9111c is formed of linear low-density polyethylene, the displacement rate DR is a high value of 0.38×10$^{-2}$/° C. On the other hand, in case where the folded fiber 9111c is formed of a resin other than linear low-density polyethylene (e.g., high-density polyethylene or nylon 66), the displacement rate DR is a low value. For example, the fiber 9111c formed of high-density polyethylene has a low displacement rate DR of 0.12×10$^{-2}$/° C. The fiber 9111c formed of nylon 66 has a low displacement rate DR of 0.096×10$^{-2}$/° C.

(Examples Included in the Preceding Application)

Hereinafter, the present invention will be described in more detail with reference to the examples.

Inventive Example 1A

L-LDPE pellets (available from Sigma Aldrich Corporation) having a density of 0.918 g/cm³ were loaded into a melt extruder. While the temperature inside the melt extruder was maintained at 220 degrees Celsius, the L-LDPE was left at rest in the inside of the melt extruder for approximately 30 minutes. Then, the melted L-LDPE was pushed out of the nozzle attached to the tip of the melt extruder. The nozzle had a diameter of 1 millimeter. In this way, yarn formed of L-LDPE was obtained from the tip of the nozzle. The yarn was wound around a first roller (not shown) having a diameter of 5 centimeters. In this way, the yarn formed of L-LDPE (diameter: approximately 0.5 millimeters) was obtained. This yarn had an elastic coefficient of 0.16 GPa.

Figure 16A:
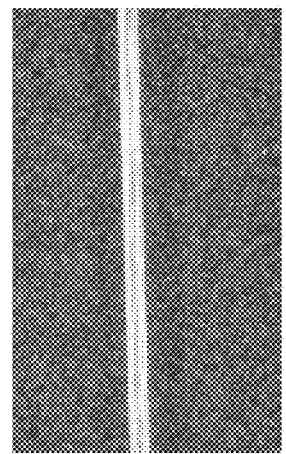
FIG. 16A is a photograph showing the extended fiber 111a obtained in the inventive example 1 in the preceding application.

Next, one end of the yarn was bound to a second roller (not shown) having a diameter of 5 centimeters. A plate heated to 80 degrees Celsius was located between the first roller and the second roller. While the yarn was brought into contact with the surface of the plate, the yarn was supplied from the first roller and the yarn extended by the heat was wound around the second roller. In this way, the fiber 9111a wound around the second roller was obtained. In other words, the extended yarn is the fiber 9111a. The rotation speed of the first roller was 2 rpm. The rotation speed of the second roller was 20 rpm. In this way, the yarn was extended to obtain the fiber 9111a. The fiber 9111a had a diameter of 0.12 millimeters. FIG. 16A is a photograph showing the fiber 9111a. In this way, the fiber 9111a shown in FIG. 13A was obtained. The fiber 9111a had an elastic coefficient of 2.5 GPa.

Figure 17A:
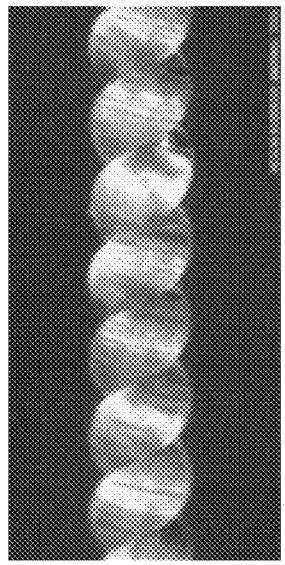
FIG. 17A is a photograph showing the folded fiber 111c obtained in the inventive example 1A in the preceding application.

Then, the fiber 9111a was cut to obtain the fiber 9111a having a length of 26 millimeters. While a tension was applied to the fiber 9111, the fiber 9111 was twisted to obtain the twisted fiber 9111b shown in FIG. 13B. Furthermore, the fiber 9111 was twisted to obtain the folded fiber 9111c shown in FIG. 13C. In the inventive example 1A, the tension was 8 MPa. FIG. 17A is a photograph showing the folded fiber 9111c obtained in the inventive example 1A. The length L3 of the folded fiber 9111c was 9.7 millimeters.

The folded fiber 9111c obtained in the inventive example 1A had a spring index C of 0.73.

Inventive Example 1B

In the inventive example 1B, an experiment similar to the inventive example 1A was conducted, except that the tension was 10 MPa. The folded fiber 9111c obtained in the inventive example 1B had a spring index C of 0.52.

Inventive Example 1C

In the inventive example 1C, an experiment similar to the inventive example 1A was conducted, except that the tension was 17 MPa. The folded fiber 9111c obtained in the inventive example 1C had a spring index C of 0.54.

Inventive Example 1D

In the inventive example 1D, an experiment similar to the inventive example 1A was conducted, except that the tension was 20 MPa. The folded fiber 9111c obtained in the inventive example 1D had a spring index C of 0.50.

Inventive Example 1E

In the inventive example 1E, an experiment similar to the inventive example 1A was conducted, except that the tension was 30 MPa. The folded fiber 9111c obtained in the inventive example 1E had a spring index C of 0.50.

Comparative Example 1A

In the comparative example 1A, an experiment similar to the inventive example 1A was conducted except the following matters (I)-(IV).

(I) In place of L-LDPE, used were pellets of low-density polyethylene (hereinafter, referred to as "LDPE", available from Sigma Aldrich Corporation) having a density of 0.906 g/cm³.

(II) The temperature inside the melt extruder was maintained at 95 degrees Celsius.

(III) The temperature of the heated plate was 85 degrees Celsius.

(IV) The rotation speed of the second roller was 8 rpm.

Figure 16B:
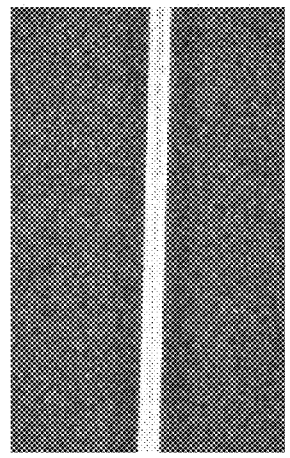
FIG. 16B is a photograph showing the extended fiber 111a obtained in the comparative example 1A in the preceding application.

FIG. 16B is a photograph showing the extended fiber 9111a obtained in the comparative example 1A. This fiber 9111a had a diameter of 0.1 millimeter and an elastic coefficient of 0.1 GPa.

While a tension of 5 MPa was applied to the fiber 9111, the fiber 9111a was twisted. However, before the fiber 9111 was folded, namely, before the shape of the cylindrical coil was formed, the fiber 9111a was broken. In other words, the fiber 9111a was broken into two parts.

Comparative Example 1B

In the comparative example 1B, an experiment similar to the comparative example 1A was conducted, except that the tension was 10 MPa. Similarly to the case of the comparative example 1A, the fiber 9111a was broken before the shape of the cylindrical coil was formed.

Comparative Example 1C

In the comparative example 1C, an experiment similar to the comparative example 1A was conducted, except that the rotation speed of the second roller was 12 rpm. However, the yarn was cleaved into two parts between the first roller and the second roller. Therefore, the fiber 9111a was not obtained.

Comparative Example 2A

In the comparative example 2A, an experiment similar to the inventive example 1A was conducted except the following matters (I)-(III).

(I) In place of L-LDPE, used were pellets of high-density polyethylene (hereinafter, referred to as "HDPE", available from Sigma Aldrich Corporation) having a density of 0.96 g/cm³.

(II) The temperature of the heated plate was 100 degrees Celsius.

(III) The rotation speed of the first roller and the second roller was 1 rpm and 25 rpm, respectively.

Figure 16C:
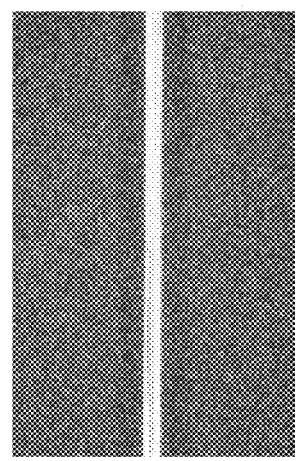
FIG. 16C is a photograph showing the extended fiber 111a obtained in the comparative example 2A in the preceding application.

FIG. 16C is a photograph showing the extended fiber 9111a obtained in the comparative example 2A. This fiber 9111a had a diameter of 0.14 millimeters and an elastic coefficient of 1.5 GPa.

Figure 17B:
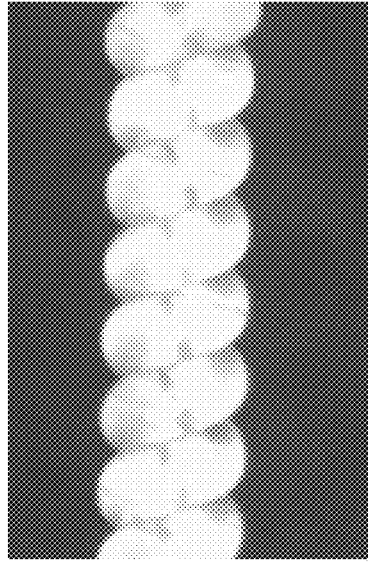
FIG. 17B is a photograph showing the folded fiber 111c obtained in the comparative example 2A in the preceding application.

Then, the fiber 9111a was cut to obtain the fiber 9111a having a length of 70 millimeters. While a tension of 10 MPa was applied to the fiber 9111, the fiber 9111 was twisted to obtain the twisted fiber 9111b shown in FIG. 13B. Furthermore, the fiber 9111 was twisted to obtain the folded fiber 9111c shown in FIG. 13C. FIG. 17B is a photograph showing the folded fiber 9111c obtained in the comparative example 2A. The length L3 of the folded fiber 9111c was 13.3 millimeters.

The folded fiber 9111c obtained in the comparative example 2A had a spring index C of 1.21.

Comparative Example 2B

In the comparative example 2B, an experiment similar to the comparative example 2A was conducted, except that the tension was 20 MPa. The folded fiber 9111c obtained in the comparative example 2B had a spring index C of 1.03.

Comparative Example 2C

In the comparative example 2C, an experiment similar to the comparative example 2A was conducted, except that the tension was 30 MPa, In the comparative example 2C, the fiber 9111a was obtained; however, the fiber 9111 was broken during the twist before the shape of the coil was formed.

Comparative Example 3A

In the comparative example 3A, an experiment similar to the inventive example 1A was conducted except the following matters (I)-(IV).

(I) In place of L-LDPE, used were pellets of nylon 66 (available from Sigma Aldrich Corporation) having a density of 1.14 g/cm$^3$. After the pellets were left at rest in a vacuum oven maintained at 210 degrees Celsius for six hours, the pellets were loaded into the melt extruder.

(II) The temperature inside the melt extruder was maintained at 265 degrees Celsius (III) The temperature of the heated plate was 175 degrees Celsius.

(IV) The rotation speed of the first roller and the second roller was 5 rpm and 25 rpm, respectively.

Figure 16D:
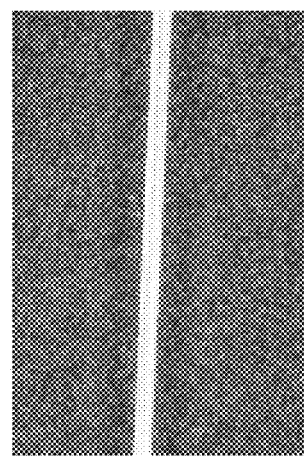
FIG. 16D is a photograph showing the extended fiber 111a obtained in the comparative example 3A in the preceding application.

FIG. 16D is a photograph showing the extended fiber 9111a obtained in the comparative example 3A. This fiber 9111a had a diameter of 0.12 millimeters and an elastic coefficient of 3.7 GPa.

Figure 17C:
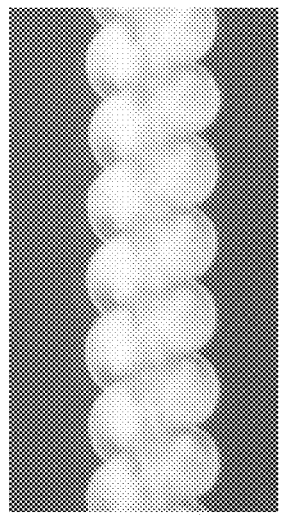
FIG. 17C is a photograph showing the folded fiber 111c obtained in the comparative example 3A in the preceding application.

Then, the fiber 9111a was cut to obtain the fiber 9111a having a length of 56 millimeters. While a tension of 17 MPa was applied to the fiber 9111, the fiber 9111 was twisted to obtain the twisted fiber 9111b shown in FIG. 13B. Furthermore, the fiber 9111 was twisted to obtain the folded fiber 9111c shown in FIG. 13C. FIG. 17C is a photograph showing the folded fiber 9111c obtained in the comparative example 3A. The length L3 of the falded fiber 9111c was 12.1 millimeters.

The folded fiber 9111c obtained in the comparative example 3A had a spring index C of 1.15.

Comparative Example 3B

In the comparative example 3B, an experiment similar to the comparative example 3A was conducted, except that the tension was 30 MPa. The folded fiber 9111c obtained in the comparative example 3B had a spring index C of 1.1.

Comparative Example 3C

In the comparative example 3C, an experiment similar to the comparative example 3A was conducted, except that the tension was 45 MPa. In the comparative example 3C, the fiber 9111 was obtained; however the fiber 9111 was broken during the twist before the shape of the coil was formed.

(Thermomechanical Analysis)

The folded fibers 9111c obtained in the inventive example 1A, the comparative example 2A, and the comparative example 3A were subjected to thermomechanical analysis. More specifically, the folded fibers 9111c were loaded into a thermomechanical analysis device (available from Rigaku Corporation, trade name: TMA8310) to analyze the thermomechanical properties thereof, FIG. 18 is a graph showing the thermomechanical properties of the folded fibers 111c obtained in the inventive example 1A, the comparative example 2A, and the comparative example 3A.

Figure 18:
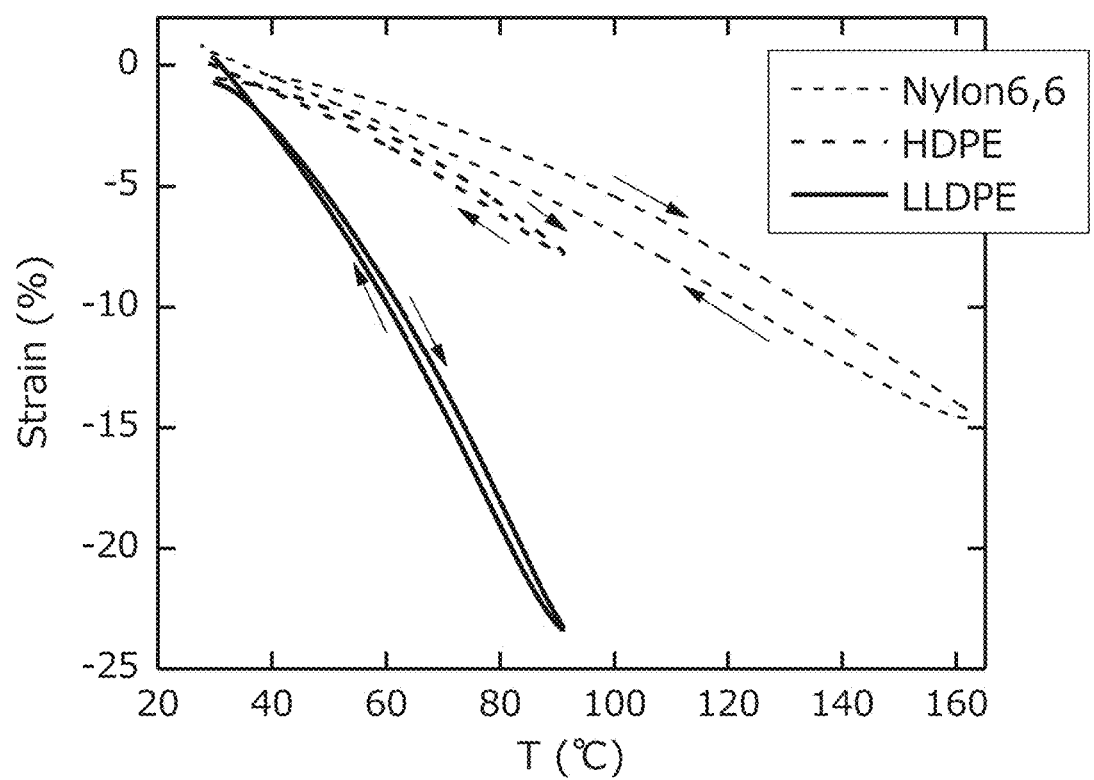
FIG. 18 is a graph showing thermomechanical properties of the fibers 111c obtained in the inventive example 1A, the comparative example 2A and the comparative example 3A in the preceding application.

In FIG. 18, the horizontal axis indicates temperature (Celsius). The vertical axis indicates strain. The strain is calculated in accordance with the following mathematical formula (II).

$$(\text{Strain}) = (x - y)/(x) \quad \text{(II)}$$

where x represents a length of the folded fiber along the axis direction of the cylindrical coil before the folded fiber is heated (namely, at a temperature of approximately 30 degrees Celsius), and y represents a length of the folded fiber along the axis direction of the cylindrical coil after the folded fiber is heated.

In other words, the following mathematical formula (III) is satisfied, $$(\text{Displacement Rate DR}) = (\text{Strain})/\Delta T$$

where ΔT represents a temperature difference of the folded fiber between before and after the fiber is heated.

In the inventive example 1A, the length L3 of the folded fiber 9111c was 9.7 millimeters. When the fiber 9111c was heated to 90 degrees Celsius, the fiber 9111c had a length L3 of 7.5 millimeters. In other words, when the fiber 9111c was heated to 90 degrees Celsius, the fiber 9111c was contracted in such a manner that the fiber 9111c had a length L3 of 7.5 millimeters. Then, when the fiber 9111c was cooled to 30 degrees Celsius, the length L3 of the fiber 9111c returned to 9.7 millimeters.

In the inventive example 1A, the displacement rate DR was calculated as below.

Displacement rate DR=(9.7 mm-7.5 mm)/(9.7 mm·(90° C.-30° C.))=0.38×10$^{-2}$/° C.

In the comparative example 2A, the length L3 of the folded fiber 9111c was 13.3 millimeters. Then, the folded fiber 9111c was heated to 90 degrees Celsius. In the comparative example 2A, when the fiber 9111c was heated to 90 degrees Celsius, the fiber 9111c had a length L3 of 12.3 millimeters. When the fiber 9111c was cooled to 30 degrees Celsius, the length L3 of the fiber 9111c returned to 13.3 millimeters.

In the comparative example 2A, the displacement rate DR was calculated as below.

Displacement rate DR=(13.3 mm-12.3 mm)/(13.3 mm·(90° C.-30° C.))=0.13×10$^{-2}$/° C.

In the comparative example 3A, the folded fiber 9111c had a spring index C of 1.15. The length L3 of the folded fiber 9111c was 12.1 millimeters. Then, the folded fiber

9111c was heated to 90 degrees Celsius. In the comparative example 3A, when the fiber 9111c was heated to 90 degrees Celsius, the fiber 9111c had a length L3 of 11.4 millimeters. When the fiber 9111c was cooled to 30 degrees Celsius, the length L3 of the fiber 9111c returned to 12.1 millimeters.

In the comparative example 3A, the displacement rate DR was calculated as below.

$$\text{Displacement rate } DR = (12.1 \text{ mm} - 11.4 \text{ mm})/(12.1 \text{ mm} \cdot (90° \text{ C.} - 30° \text{ C.})) = 0.096 \times 10^{-2}/°\text{ C.}$$

The following Table 1 and Table 2 show the results of the inventive examples and the comparative examples.

TABLE 1

|  | Materials of Fiber 9111 | Tension (MPa) | Spring Index C |
|---|---|---|---|
| Inventive example 1A | L-LDPE | 8 | 0.73 |
| Inventive example 1B | L-LDPE | 10 | 0.52 |
| Inventive example 1C | L-LDPE | 17 | 0.54 |
| Inventive example 1D | L-LDPE | 20 | 0.50 |
| Inventive example 1E | L-LDPE | 30 | 0.50 |
| Comparative example 1A | LDPE | 5 | (broken) |
| Comparative example 1B | LDPE | 10 | (broken) |
| Comparative example 1C | LDPE | (Fiber was not obtained) | |
| Comparative example 2A | HDPE | 10 | 1.21 |
| Comparative example 2B | HDPE | 20 | 1.03 |
| Comparative example 2C | HDPE | 30 | (broken) |
| Comparative example 3A | Nylon 66 | 17 | 1.15 |
| Comparative example 3B | Nylon 66 | 30 | 1.1 |
| Comparative example 3C | Nylon 66 | 45 | (broken) |

TABLE 2

|  | Materials of Fiber 9111 | Length L3 (mm) at 30 degrees Celsius | Length L3 (mm) at 90 degrees Celsius | Displacement Rate (° C.$^{-1}$) |
|---|---|---|---|---|
| Inventive example 1A | L-LDPE | 9.7 | 7.5 | $0.38 \times 10^{-2}$ |
| Comparative example 2A | HDPE | 13.3 | 12.3 | $0.13 \times 10^{-2}$ |
| Comparative example 3A | Nylon 66 | 12.1 | 11.4 | $0.096 \times 10^{-2}$ |

As is clear from Table 1, the fiber formed of linear low-density polyethylene is not broken even when the spring index C is less than 1. However, it is impossible to form a cylindrical coil having a spring index C of less than 1 by twisting the fiber formed of low-density polyethylene, high-density polyethylene, or nylon 66.

As is clear from Table 2, the fiber 9111c formed of linear low-density polyethylene had a high displacement rate DR of 0.38×10$^{-2}$/° C. On the other hand, the fibers 111c formed of high-density polyethylene or nylon 66 had low displacement rates DR of 0.12×10$^{-2}$/° C. and 0.096×10$^{-2}$/° C., respectively.

The invention claimed is:

1. An actuator device, comprising:
   an actuator wire;
   a net-shaped electric heating element which covers a side surface of the actuator wire and comprises heating wires; and
   a controller for supplying electric power to the net-shaped electric heating element to heat the net-shaped electric heating element;
   wherein
   the actuator wire is capable of being contracted by application of heat and restored by release of heat;
   the side surface of the actuator wire is formed of polymer;
   one end of the net-shaped electric heating element is connected to one end of the actuator wire;
   another end of the net-shaped electric heating element is connected to another end of the actuator wire;
   the net-shaped electric heating element is in contact with the side surface of the actuator wire, when the net-shaped electric heating element is not heated; and
   the net-shaped electric heating element is moved outward from the side surface of the actuator wire due to contraction of the actuator wire, when the net-shaped electric heating element is heated.

2. The actuator device according to claim 1, wherein
   each of the electric heating wires winds helically around the side surface of the actuator wire; and
   the electric heating wires are braided so as to form the net-shaped electric heating element.

3. The actuator device according to claim 2, wherein
   the electric heating wires are braided in a left-hand lay.

4. The actuator device according to claim 2, wherein
   the electric heating wires are braided in a right-hand lay.

5. The actuator device according to claim 1, wherein
   each of the electric heating wires has a shape of a rectangular wave; and
   the electric heating wires each having a shape of a rectangular wave are knitted so as to form the net-shaped electric heating element.

6. The actuator device according to claim 1, wherein
   each of the electric heating wires winds helically around the side surface of the actuator wire; and
   the electric heating wires are weaved so as to form the net-shaped electric heating element.

7. The actuator device according to claim 1, wherein
   the actuator wire is formed of a fiber; and
   the fiber is twisted around a longitudinal axis thereof;
   the fiber is folded so as to have a shape of a cylindrical coil;
   the fiber is formed of a linear low-density polyethylene; and
   the following mathematical formula (I) is satisfied:

$$D/d < 1 \quad (I)$$

where
   D represents a mean diameter of the cylindrical coil;
   d represents a diameter of the fiber;
   the linear low-density polyethylene has a density of not less than 0.915 g/cm$^3$ and not more than 0.925 g/cm$^3$; and
   the linear low-density polyethylene has a weight-average molecular weight of not less than 50 kg/mol and not more than 200 kg/mol.

8. An actuator, comprising:
   an actuator wire; and
   a net-shaped electric heating element which covers a side surface of the actuator wire and comprises heating wires;
   wherein
   the actuator wire is capable of being contracted by application of heat and restored by release of heat;
   the side surface of the actuator wire is formed of polymer; and
   the net-shaped electric heating element is moved outward from the side surface of the actuator wire due to contraction of the actuator wire, when the net-shaped electric heating element is heated.

9. The actuator according to claim 8, wherein
one end of the net-shaped electric heating element is connected to one end of the actuator wire; and
another end of the net-shaped electric heating element is connected to another end of the actuator wire.

10. The actuator according to claim 8, further comprising:
a first connector; and
a second connector,
wherein
one end of the net-shaped electric heating element is connected to one end of the actuator wire with the first connector; and
another end of the net-shaped electric heating element is connected to another end of the actuator wire with the second connector.

11. The actuator according to claim 8, wherein
each of the electric heating wires winds helically around the side surface of the actuator wire; and
the electric heating wires are braided so as to form the net-shaped electric heating element.

12. The actuator according to claim 11, wherein
the electric heating wires are braided in a left-hand lay.

13. The actuator according to claim 11, wherein
the electric heating wires are braided in a right-hand lay.

14. The actuator according to claim 8, wherein
each of the electric heating wires has a shape of a rectangular wave; and
the electric heating wires each having a shape of a rectangular wave are knitted so as to form the net-shaped electric heating element.

15. The actuator according to claim 8, wherein
each of the electric heating wires winds helically around the side surface of the actuator wire; and
the electric heating wires are weaved so as to form the net-shaped electric heating element.

16. The actuator according to claim 8, wherein
the actuator wire is formed of a fiber; and
the fiber is twisted around a longitudinal axis thereof;
the fiber is folded so as to have a shape of a cylindrical coil;
the fiber is formed of a linear low-density polyethylene; and
the following mathematical formula (I) is satisfied:

$$D/d<1 \qquad (I)$$

where
D represents a mean diameter of the cylindrical coil;
d represents a diameter of the fiber;
the linear low-density polyethylene has a density of not less than 0.915 g/cm$^3$ and not more than 0.925 g/cm$^3$; and
the linear low-density polyethylene has a weight-average molecular weight of not less than 50 kg/mol and not more than 200 kg/mol.

\* \* \* \* \*